(12) United States Patent
Walker

(10) Patent No.: US 7,773,822 B2
(45) Date of Patent: Aug. 10, 2010

(54) APPARATUS AND METHODS FOR MANAGEMENT OF ELECTRONIC IMAGES

(75) Inventor: James Robert Walker, Ramsey, MN (US)

(73) Assignee: ColorMax, Inc., Paynesville, MN (US)

( * ) Notice: Subject to any disclaimer, the term of this patent is extended or adjusted under 35 U.S.C. 154(b) by 1135 days.

(21) Appl. No.: 11/416,987

(22) Filed: May 2, 2006

(65) Prior Publication Data

US 2007/0011149 A1    Jan. 11, 2007

Related U.S. Application Data

(60) Provisional application No. 60/676,898, filed on May 2, 2005.

(51) Int. Cl.
  *G06K 9/40*     (2006.01)
  *G06K 9/54*     (2006.01)
  *G06F 17/30*    (2006.01)

(52) U.S. Cl. .................. 382/254; 382/305; 707/713

(58) Field of Classification Search ................ 382/113, 382/181, 229, 305, 182, 254; 707/1–10, 707/104.1, 705–708, 713
  See application file for complete search history.

(56) References Cited

U.S. PATENT DOCUMENTS

| | | | |
|---|---|---|---|
| 5,319,745 A * | 6/1994 | Vinsonneau et al. | 715/234 |
| 5,867,277 A * | 2/1999 | Melen et al. | 358/296 |
| 5,960,448 A * | 9/1999 | Reichek et al. | 715/236 |
| 6,055,543 A * | 4/2000 | Christensen et al. | 707/104.1 |
| 6,208,988 B1 * | 3/2001 | Schultz | 707/5 |
| 6,757,081 B1 * | 6/2004 | Fan et al. | 358/474 |
| 7,069,518 B2 * | 6/2006 | Card et al. | 715/776 |
| 7,536,706 B1 * | 5/2009 | Sezan et al. | 725/113 |
| 2002/0083079 A1 * | 6/2002 | Meier et al. | 707/104.1 |
| 2003/0033296 A1 * | 2/2003 | Rothmuller et al. | 707/3 |
| 2003/0169923 A1 * | 9/2003 | Butterworth | 382/181 |
| 2005/0160115 A1 * | 7/2005 | Starkweather | 707/104.1 |
| 2008/0126305 A1 * | 5/2008 | Sayeler et al. | 707/3 |

* cited by examiner

*Primary Examiner*—Daniel G Mariam
(74) *Attorney, Agent, or Firm*—Clise, Billion & Cyr, P.A.; Tim Clise

(57) ABSTRACT

Systems including hardware and computer software and methods can create a text-searchable data structure that includes electronic image documents. The system may be configured in modules. The system converts an electronic image document into a visually optimized electronic image document and into a detail optimized electronic image document. The system also includes an OCR engine that abstracts character information from the detail optimized electronic image document and writes the character information into a text file. The visually optimized electronic image document is linked with the text file in a data structure by the system. The resulting data structure, which may be an image over hidden text pdf document, may be searched using various text based search techniques. When specified text is located in a text file, the corresponding visually optimized electronic image document may then be presented to the searcher.

19 Claims, 17 Drawing Sheets

Figure 1
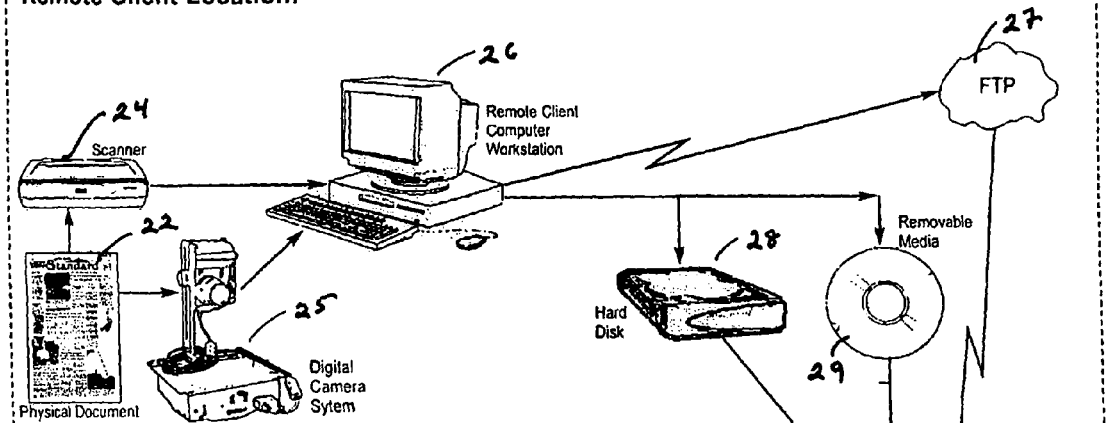
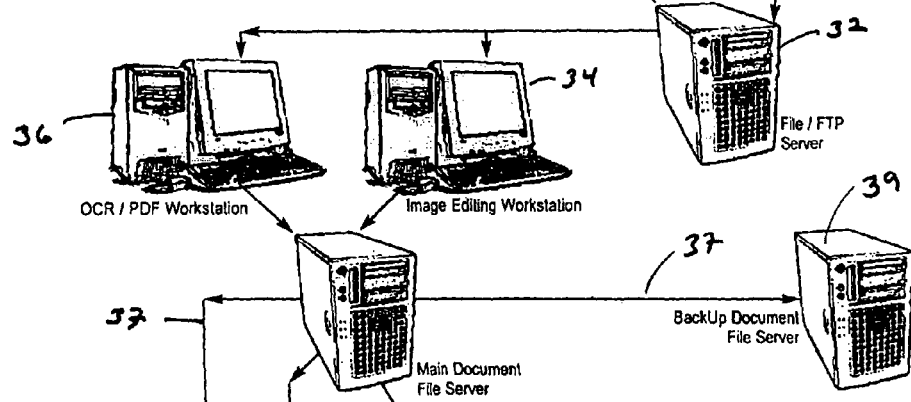
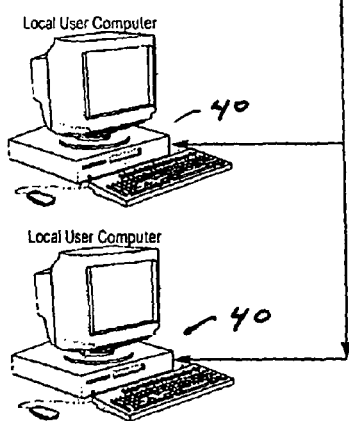
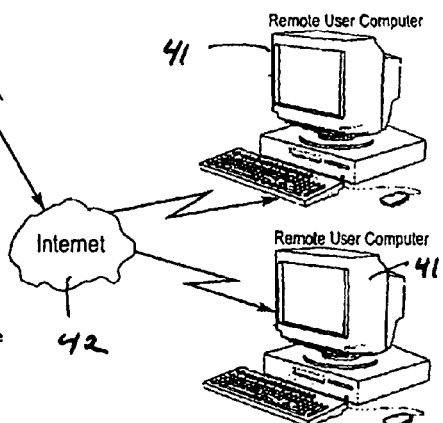

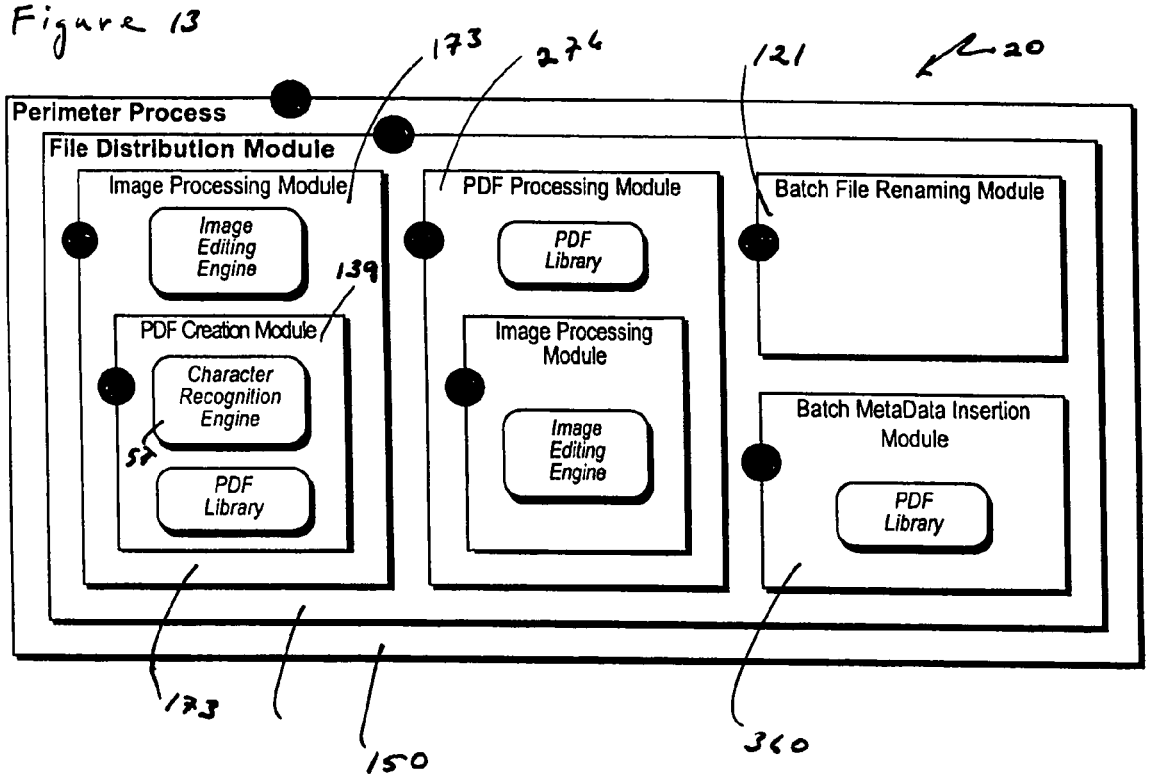

APPARATUS AND METHODS FOR MANAGEMENT OF ELECTRONIC IMAGES

CROSS-REFERENCE TO RELATED APPLICATIONS

This application claims the benefit of the filing date of U.S. Provisional Patent Application Ser. No. 60/676,898 filed May 2, 2005, which is hereby incorporated by reference herein in its entirety.

BACKGROUND OF THE INVENTION

1. Field of the Invention

The present invention relates to systems in the form of computer software and hardware and methods for management of electronic image documents containing textual data.

2. Background of the Related Art

Historically, various physical documents including paper documents, microfiche, and microfilm, have been used for information storage. Physical documents have been manually archived and indexed. Indexing physical documents enables a user to find a particular document within an archive. In many cases, the physical document is a paper document that has been recorded on microfilm or microfiche and archived in this form. Whatever the form of the physical document, whether paper document, microfilm, or microfiche, physical document storage systems have typically been bulky, labor intensive, prone to loss of physical documents through misfiling, and difficult to use.

More recently, physical documents have been stored as electronic image documents in image formats on digital media such as magnetic media and optical media, so that images of the physical documents may be retrieved by computer. An electronic image document may be created from a physical document, meaning a paper or microfiche or microfilm document, and then stored on digital media. The electronic image document is created by scanning or digitally photographing or otherwise converting the physical document to an image format using a combination of hardware and software. Some physical documents are derived from an electronic image document, so that conversion from a physical document would not be required, as the physical document already exists in an image format. All of the physical documents in an archive could be converted to electronic image documents and stored in image format in a data structure. Unfortunately, electronic image documents in a data structure are not efficiently searchable based on the content of the electronic image documents.

To make electronic image documents in a data structure searchable, prior methods linked text files that contained the textual information contained within the electronic image document with the corresponding electronic image document in the data structure. The data structure could then be searched using text-based search strategies and the corresponding electronic image documents retrieved from the data structure. Typically, the text file was created from an electronic image documents by processing the electronic image documents with an optical character recognition (OCR) software engine. The OCR engine analyzes the pixels of each electronic image document and recognizes the alphanumeric characters that may be contained within the electronic image document. When any subset of the pixels of the electronic image document are found to be an alphanumeric character by the OCR engine, the OCR engine then creates corresponding text characters in a corresponding text file. The text file may then be stored in a searchable data structure that links the text file to the electronic image document from which the text files was derived. Text based search strategies, such as searching for a particular character string within the text file, would then link search results to the corresponding image file, so that the end user may then view the image file that contains the particular character string. However, there are inherent inefficiencies in this process.

The OCR engine requires a detail optimized electronic image document to most accurately generate a text file from an electronic image document. A detail optimized electronic image document may be created directly from the physical document. Alternatively, an electronic image document may be converted to a detail optimized electronic image document. The OCR engine then processes the detail optimized electronic image document to create the corresponding text file.

A detail optimized electronic image document may be defined as an electronic image document that optimizes the accuracy of the OCR process. Optimizing an electronic image document for detail to produce a detail optimized electronic image document may include producing a high resolution electronic image document in black and white. When a detail optimized electronic image document is processed by the OCR engine, the accuracy of the conversion of pixels in the electronic image document to text is maximized, and the error rate of the conversion of pixels in the electronic image document to text is minimized. The efficiency of conversion of pixels in the electronic image document to text by the OCR engine may be also improved by using a detail optimized electronic image document, so that using detail optimized electronic image documents may result in faster production of text files by the OCR engine. This would result in increased productivity when the OCR engine processes many detail optimized electronic image documents.

An accurate text file means that the text file accurately mirrors the text contained in the corresponding electronic image document, which provides a number of advantages. Having an accurate text file improves the ability to search the text file content using text based search strategies, which makes the corresponding electronic image document more accessible. For example, a search in the data structure for a particular character string finds text files that contain the character string, and those text files accurately reflect the character string in the corresponding electronic image documents. Conversely, character strings in the electronic image documents are accurately reflected in the text file. Inaccuracies in the text file would mean that text based search strategies such as a search for a particular character string would fail to uncover an electronic image document that contained that particular character string whenever the particular character string in the electronic image document was inaccurately reproduced in the corresponding text file. Thus, inaccuracies in the text file resulting from errors in the OCR process leads to loss of the information contained in the electronic image documents because of the inability to locate particular electronic image documents using text based search strategies.

Although the detail optimized electronic image document maximizes the accuracy of the OCR process, the detail optimized electronic image document may be a large file, with corresponding increased storage requirements and slower retrieval time. Furthermore, a detail optimized electronic image document lacks visual appeal. This may be particularly true when the detail optimized electronic image document was originally derived from an electronic image document that included colored elements.

Alternatively, a visually optimized electronic image document may be created directly from the physical document, or an existing electronic image document may be converted into a visually optimized electronic image document. The OCR engine may then processes the visually optimized electronic image document to create the corresponding text file. A visually optimized electronic image document retains the original colors of the electronic image document, and may eliminate details not necessary for a user to optimally perceive what is contained in the electronic image document. The visually optimized electronic image document is often a more appealing and, in some case, more legible electronic image document than a corresponding detail optimized electronic image document. Furthermore, the file size of a visually optimized electronic image document can be smaller and, depending on the image content, may be significantly smaller than the file size of a corresponding detail optimized electronic image document. Thus, a visually optimized electronic image document may require less storage and have faster retrieval times than the corresponding detail optimized electronic image document.

However, an OCR engine may have a higher error rate when creating the text file from the visually optimized electronic image document. This increase in the error rate can reduce the accuracy of the text file, can reduce the ability to search the text file, and may affect the overall utility of the data structure.

Accordingly, prior methods have produced electronic image documents from physical documents or from electronic image documents having a balance of detail and content somewhere between the detail optimized electronic image document and the visually optimized electronic image document. The goal generally has been to create electronic image documents that strike a balance between the ability to be accurately processed by an OCR engine, the electronic image document file size, and the visual appeal of the electronic image document. However, the resulting electronic image document may be a compromise that does not include the advantages of either the detail optimized electronic image document or the visually optimized electronic image document. In other words, the resulting electronic image document may lack visual appeal and produce errors when processed by an OCR engine. An end user may be unable to locate some electronic image documents within the archive and the electronic image documents displayed to the end user may not be aesthetically pleasing.

Therefore, a need exists for apparatus and methods that can most efficiently convert electronic image documents to searchable text files while presenting a visually optimized electronic image document to an end user.

SUMMARY OF THE INVENTION

Apparatus and methods in accordance with the present invention can address the above-referenced needs and may provide additional advantages and improvements that may be recognized by those skilled in the art upon review of the following specification and attached figures.

The apparatus and methods in accordance with the present invention include systems in the form of computer software for creating a text-searchable data structure that includes electronic image documents. The system according to the present invention may be configured in modules. The system converts an electronic image document into a visually optimized electronic image document and converts an electronic image document into a detail optimized electronic image document. The system also includes an OCR engine that abstracts character information from the detail optimized electronic image document and writes the character information into a text file. The visually optimized electronic image document is linked with the text file in a data structure by the system. The resulting data structure may be searched using text based search techniques. When specified text is located in a text file, the corresponding visually optimized electronic image document may then be presented to the searcher.

The system may further include a module that writes metadata to a metadata record in the data structure. The metadata record is linked with the text file and the visually optimized electronic image document in the data structure in order to aid in the identification of visually optimized electronic image documents and facilitate text based searching of the text files in the data structure.

The present invention also provides methods for creating a text searchable data structure containing electronic image documents. The method includes providing an electronic image document, generating a visually optimized electronic image document from the electronic image document, generating a detail optimized electronic image document from the electronic image document, using an optical character recognition engine to create a text file from the detail optimized electronic image document, and linking the visually optimized image with the text file in a data structure. The method may further include writing metadata to a metadata record in the data structure, and linking the metadata record with the text file and the visually optimized electronic image document in the data structure.

Other features and advantages of the invention will become apparent from the following detailed description, and from the claims.

BRIEF DESCRIPTION OF THE FIGURES

FIG. 1 illustrates an exemplary embodiment of hardware components of an apparatus in accordance with the present invention;

DETAILED DESCRIPTION OF THE INVENTION

Figure 2A:
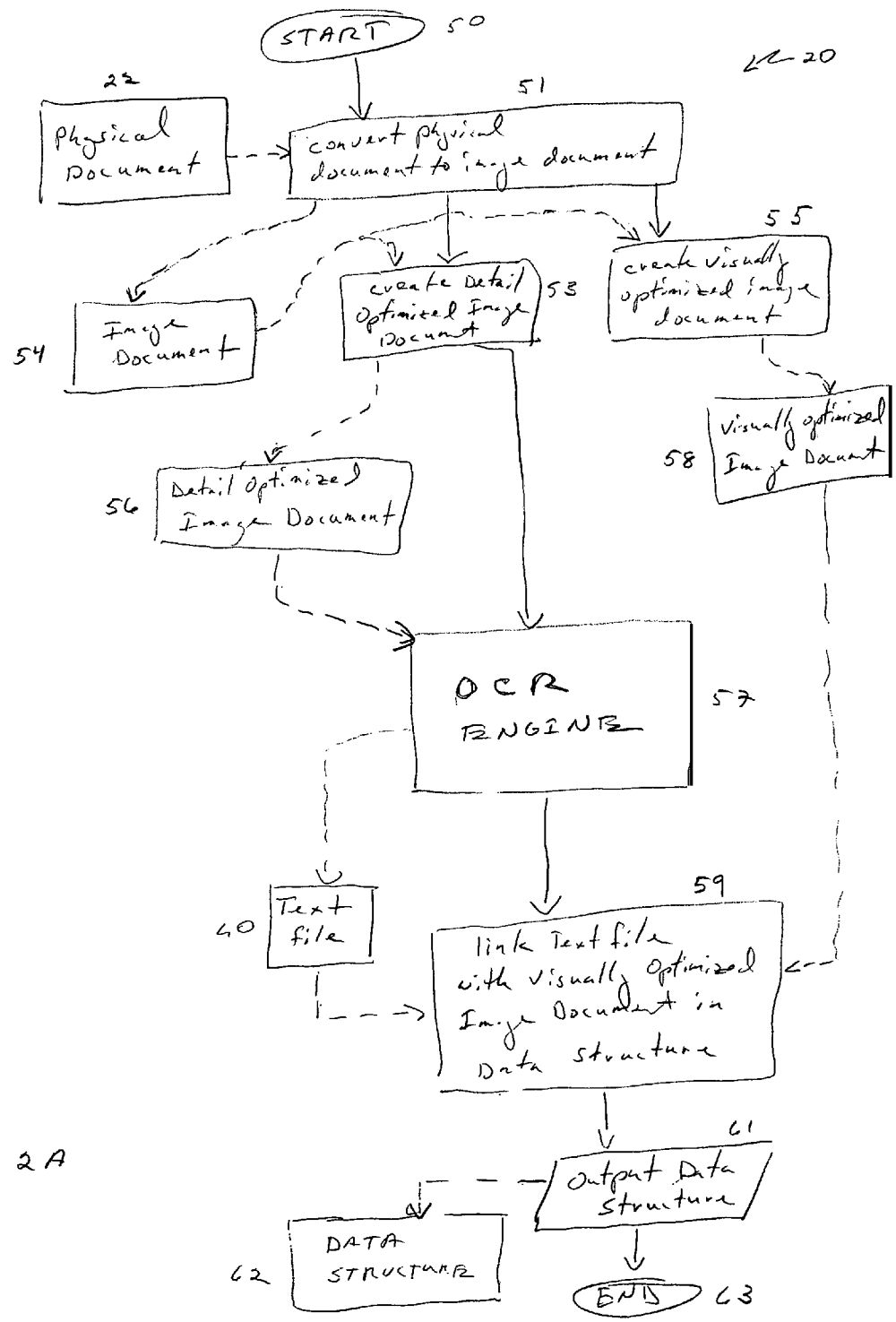
FIG. 2A illustrates the data flow and flow of operations between modules in an exemplary embodiment in the form of a block diagram of a system in accordance with the present invention.

The present invention provides apparatus, systems, and methods for receiving and processing images. In one aspect, apparatus and methods may include hardware, which encompasses computer hardware and imaging hardware, and a system in the form of computer software.

The apparatus in accordance with the present invention may be configured to create a data structure 62 containing visually optimized electronic image documents 58 linked with text files 60. The apparatus creates a detail optimized electronic image document 56 and a visually optimized electronic image document 58 from the same physical document 22 or from the same electronic image document 54. The text file 60 is derived by processing the detail optimized electronic image document 56 with an OCR engine 57. The data structure 62 contains at least one or more text files 60 and one or more corresponding visually optimized electronic image documents 58. The data structure 62 is configured so that text files 60 are linked with the corresponding visually optimized electronic image documents 58. The detail optimized electronic image document 56 is processed by the OCR engine 57 to obtain the text file 60. The text file 60 is linked with the visually optimized electronic image document 58 in the data structure 62.

Electronic image document 54 may be a document, photograph, or other image in an image format. Examples of image formats may include tiff files, jpeg files, and the image layers 68 in an image over hidden text pdf document 138. A detail optimized electronic image document 56 may be defined as an electronic image document 54 that optimizes the accuracy of the OCR engine 57. The detail optimized electronic image document 56 is usually a black and white document even though the electronic image document 54 from which the detail optimized electronic image document 56 is derived may be in color. A visually optimized electronic image document 58 is an electronic image document 54 having visual appeal. The visually optimized electronic image document 58 may have color and may be a more faithful reproduction of a corresponding physical document 22 from the standpoint of a human viewer of the visually optimized electronic image document 58.

A text file 60 is a file that contains textual information such that the textual information is searchable by text based search strategies. Examples of text files 60 may include ASCII files, .txt files, and a layer 68 in an image over hidden text pdf document 138 that contains textual information.

A data structure 62 is a way of storing data in digital form so that the data may be used efficiently. The data structure 62 may link different data types and different data formats. For example, the data structure 62 may link visually optimized electronic image documents 58, text files 60, and metadata records 64. For example, visually optimized electronic image documents 58 in jpeg format may be linked to text files 60 containing the textual information contained within the electronic image documents and with metadata records 64. As another example, the data structure 62 may be an image over hidden text pdf document 138 with the visually optimized electronic image document 58 in one or more layers 68 in the image over hidden text pdf document 138 and text files 60 and metadata records 64 in other layers 68 of the image over hidden text pdf document 138. A plurality of such image over hidden text pdf documents 138 may be organized into a data structure 62 making a data structure 62 of data structures 62.

A metadata record 64 consists of a set of attributes that describe data, for example, the text file 60 and the visually optimized electronic image document 58 corresponding to the text file 60. Common or standard metadata records 64 directed toward a text file 60 could include, for example, the author, title, date of creation or publication, subject coverage, and keywords. A metadata system is a methodology for creating, storing, and accessing metadata records 64 for a text file 60 or an electronic image document 54. The linkage between a metadata record 64 and the text file 60 or an electronic image document 54 described by the metadata record 64 may take one of two forms: (1) metadata records 64 may be contained in a separate data structure 62 from the text file 60 or an electronic image document 54; (2) the metadata record 64 may be embedded in the text file 60 or an electronic image document 54.

Tagged text 66 is a unique series of characters that enclose text, which allows the tagged text 66 to be embedded in, for example, a text file 60 within a data structure 62, within a data stream, and within an electronic image document 54. Tagged text 66 contains an opening or starting string or combination of characters and a closing or ending string of characters. Nested between the opening and closing tags is the content. To avoid ambiguity, the starting and ending characters should be unique combinations of characters that can be easily extracted from other data. For example, the character sequence "<<=" could signify the start of a tagged text 66. The characters "=>>" could signify the end of the tagged text 66. Such unique character sequences make it easy to find and isolate the tagged text in other data. The content of the tagged text 66 can be, for example, words, characters, a key/value pair, or a predefined nomenclature. Tagged text 66 can be contained in an electronic image document 54 and later manipulated after the electronic image document 54 has been converted to text file 60 by an OCR engine 57. Metadata records 64 may be in the form of tagged text 66 and tagged text 66 may be included in metadata records 64.

The text files 60 in the data structure 62 may be searched using text based search strategies such as, for example, searching the text files 60 for occurrences of a specified character string. Visually optimized digital electronic image documents 58 that contain the specified character string may be located in the data structure 62 and displayed to the end user.

A system 20 in accordance with the present invention may include software resident on at least one computer that may be configured to interact with hardware 21 elements such as scanners and digital cameras to create electronic image documents 54 from an physical document 22 by scanning or digitally photographing or otherwise digitally converting the physical document including paper documents, microfiche, or microfilm to a digital image format. The system 20 may be further configured to create a detail optimized electronic image document 56 from the physical document 22, and to create a visually optimized electronic image document 58 from the physical document 22. If a physical document 22 already exists as an electronic image document 54, conversion from a physical document 22 would not be required. In this case, the software may be configured to create a detail optimized electronic image document 56 and a visually optimized electronic image document 58 from the electronic image document 54.

The system 20 may include an OCR engine 57 that processes the detail optimized electronic image document 56 to create a text file 60. The system 20 creates a data structure 62 that contains the text file 60 and links the text file 60 to the corresponding visually optimized electronic image document 58. The apparatus according to the present invention may then convert a plurality of physical documents 22, such as would be found in an archive, into a data structure 62 with a text file 60 linked with each visually optimized electronic image document 58.

An end user could then search the data structure 62 using text based search strategies including character string searches and other searching strategies for searching textual information. The search engine would, for example, search the text files 60 in the data structure 62 for the occurrence of a specified character string. Search results would then link to visually optimized electronic image documents 58 that correspond to occurrences of the specified character string in the text files 60. These visually optimized electronic image documents 58 would then be presented to the end user.

Methods according to the present invention are directed toward creating a data structure 62 containing visually optimized electronic image documents 58 linked with text files 60. The method may include providing either an electronic image document 54 or a physical document 22. The method proceeds by generating a visually optimized digital electronic image document 58 either from the electronic image document 54 or from the physical document 22, and generating a detail optimized electronic image document 58 from the electronic image document 54 or from the physical document 22. The next step in the method may be creating a text file 60 from the detail optimized electronic image document 56 by using an OCR engine 57. The method may include linking the text file 60 to the visually optimized digital image 58, and also may include discarding the detail optimized electronic image document 56. The method may conclude by presenting a visually optimized electronic image document 58 to an end user, who is searching the text file 60 in the data structure 62 using text based search strategies. The text file 60 may also be accessible to the end user.

The hardware 21 and the system 20 of the apparatus and methods according to the present invention may be configured in myriad ways, as would be understood by those skilled in the art. The hardware 21 components may communicate with one another in a variety of ways, as also would be understood by those skilled in the art. The hardware 21 components, the function of the system 20 modules, the flow of data, communications between system 20 modules, and other aspects of the present invention are generally depicted in the Figures for exemplary purposes. Generally throughout the figures, a dotted line indicates the flow of data and solid lines indicate the flow of the process. Those skilled in the art will recognize various system 20 configurations and hardware 21 configurations capable of implementing the functionality of the present inventions as well as variations in the order of processing without departing from the scope of the present invention. The system 20 and associated hardware 21 could be configured to be located at a single physical location or could be divided among a plurality of locations in a variety of ways.

The apparatus generally includes a source of electronic image documents 54, a computer 26 and a storage device such as a hard disk 28. In one exemplary embodiment, the apparatus could include a single computer 26 at a single location having a scanner 24 or digital camera system 25 for the creation of electronic image documents 54 and the processing of the electronic image documents 54.

In another embodiment, physical documents 22 may be converted to electronic image documents 54 at a remote location, and the electronic image documents 54 transmitted to a central document processing location by, for example, the Internet 42. Electronic image documents 54 may also, for example, be written to a removable media 29 at the remote location, and the removable media 29 conveyed to the central document processing location. End users may access the data structure 62 in a variety of ways including, for example, access over the Internet 42, by removable media 29, and via LAN 37.

FIG. 1 illustrates an exemplary embodiment of hardware 21 of an apparatus in accordance with the present invention. The arrows between the various exemplary hardware 21 components of the apparatus generally illustrate the transfer of data and/or the communication between the various hardware components. As shown in FIG. 1, the hardware 21 and system 20 components of the apparatus may be divided between a remote client location and a central document processing location. Physical documents 22 may be located at the remote client location. The physical document 22 may be converted to an electronic image document 54 by being scanned by a scanner 24 or by being photographed by a digital camera system 25. A control strip may be included with the physical document.

The digital camera system 25 should have sufficient resolution to capture the maximum image detail. The digital camera system 25 may have a vacuum table to secure physical documents 22 during photographing.

A computer 26 may interface with the scanner 24 and may interface with the camera system 25, and software on the computer 26 may drive the scanner 24 and may drive the digital camera system 25 and otherwise act to convert the physical document 22 to an electronic image document 54, as would be readily recognized by one skilled in the art. The resulting electronic image document 54 may reside in image format on, for example, a hard disk 28 or on removable media 29 located at the remote client location.

The physical document 22 may have been originally created by computer so that an electronic image document 54 corresponding to the physical document 22 exists. Thus, it would not be necessary to convert the physical document 22 to an electronic image document 54. For example, the electronic image document 54 may have been originally created as an electronic image document 54 in pdf format, which is then printed to produce the physical document 22.

In the embodiment illustrated in FIG. 1, the electronic image document 54 is transmitted to a central document processing location. The electronic image document 54 may be, for example, transmitted by FTP (File Transfer Protocol) 27 over a network such as the Internet 42, by conveying removable media 29 from the remote client location to the central document processing location, or by conveying a hard disk 28 from the remote client location to the central document processing location.

The electronic image documents 54 obtained from the remote client location may be further processed at the central document processing location in the embodiment illustrated in FIG. 1. The electronic image documents 54 may be routed to a File/FTP server 32. Electronic image documents 54 received via an FTP transfer may be automatically received at the File/FTP server 32. The File/FTP server 32 may optionally use an array of disk drives, network drives or removable media to store electronic image documents and may otherwise be configured to receive electronic image documents from the remote client location, as would be readily understood by one skilled in the art. The hard drives 28 and removable media 29 received from the remote client location may remain connected to the File/FTP server until all processing of electronic image documents 54 contained thereon is complete.

In the embodiment illustrated in FIG. 1, an image editing workstation 34 may process electronic image documents 54 automatically as electronic image documents 54 are transmitted to the File/FTP server 32 and from the File/FTP server 32 to the image editing workstation 34. The image editing workstation 34 may process electronic image documents 54 independent of other workstations or servers. Completed electronic image documents 54 from the image editing workstation 34 can be saved to any hard drive 28, removable media 29, workstation or server connected to the network.

The OCR workstation 36, as illustrated in the embodiment of FIG. 1, may process electronic image documents 54 with an OCR engine 57 to create text files 60 corresponding to the electronic image documents 54. The OCR engine 57 may process electronic image documents 54 automatically as electronic image documents 54 pass through the File/FTP server 32 and the image editing workstation 34. The OCR workstation 36 may process electronic image documents 54 with the OCR engine 57 independent of other workstations or servers. Text files 60 generated by the OCR workstation 36 may be written to any hard drive, removable media, workstation or server connected to the network.

The data structure 62 containing electronic image documents 54 linked with text files 60 resides on storage media associated with the main document file server 38, in the embodiment illustrated in FIG. 1. In this embodiment, the main document file server 38 may allow end users to access the data structure 62 through, for example, a graphical user interface. The data structure 62 may be indexed and made searchable by text based search strategies. The data structure 62 may be distributed on removable media 29, as illustrated.

A back-up document file server 39, as illustrated in the embodiment of FIG. 1, can be used to "mirror" the main document server 38 in case of hardware failure. The back-up document server 39 can be located at some other physical location. Also shown in the embodiment of FIG. 1 are LAN (local area network) and WAN (wide area network) networks that interconnect the various hardware components. The computers 40, in FIG. 1, represent local end users connected to the main document file server 38 through a LAN/WAN connection. Computers 41 illustrate remote user connections through the Internet 42 to the main document file server 38.

The software of the current invention is configured as a system 20, and the system 20 may be subdivided into modules. The various modules may, in turn, be subdivided into additional modules. A block diagram that illustrates the data flow and flow of operations between modules in an exemplary embodiment of a system 20 in accordance with the present invention is presented in FIG. 2A. The system 20 is entered at 50. A physical document 22 is converted to an electronic image document 54 by module 51 by scanning, digital photography, or in other ways known to those skilled in the art. The electronic image document 54 is converted into a detail optimized electronic image document 56 by module 53 and the electronic image document 54 is converted into a visually optimized electronic image document 58 at module 55. The system 20 processes the detail optimized electronic image document 58 with an OCR engine 57 to create a text file 60. Module 59 links the text file 60 with the visually optimized electronic image document 58 in a data structure 62. The detail optimized electronic image document 56 may be discarded by module 59 or otherwise destroyed by the system 20 after the detail optimized electronic image document 56 is processed by the OCR engine 57. Module 61 then outputs the data structure 62. The data structure 62 may be written to hard disk 28, removable media 29, or stored in other readily recognizable ways. The system 20 is exited at 63. Looping and other structures may be provided so that a plurality of physical documents 22 may be processed.

Figure 2B:
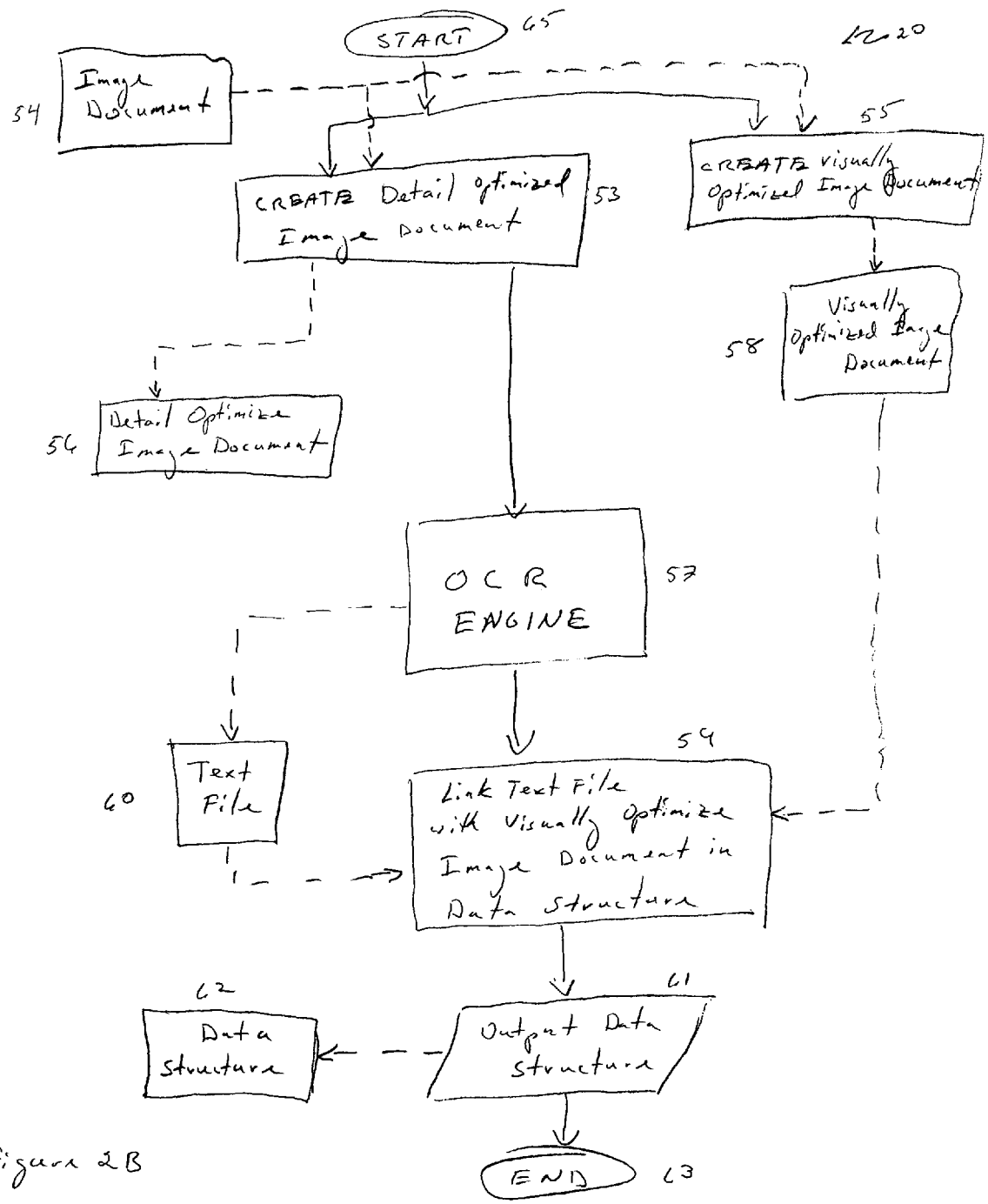
FIG. 2B illustrates the data flow and flow of operations between modules in an exemplary embodiment in the form of a block diagram of a system in accordance with the present invention.

It may not be necessary to convert a physical document 22 to an electronic image document 54 if an electronic image document 54 is available from some other source, as illustrated by the exemplary embodiment of a system 20 in accordance with the present invention presented in FIG. 2B. The system 20 is entered at 65. The electronic image document 54 is converted into a detail optimized electronic image document 56 by module 53 and the electronic image document 54 is converted into a visually optimized electronic image document 58 at module 55. The system 20 processes the detail optimized electronic image document 58 with an OCR engine 57 to create a text file 60. Module 59 links the text file 60 with the visually optimized electronic image document 58 in a data structure 62. The detail optimized electronic image document 56 may be discarded by module 59 or otherwise discarded by the system 20 after the detail optimized electronic image document 56 is processed by the OCR engine 57. Module 61 then outputs the data structure 62 by, for example, writing the data structure 62 to hard disk 28, removable media 29, or storing the data structure 62 in other readily recognizable ways. The system 20 is exited at 63. Looping and other structures may be provided so that a plurality of electronic image documents 54 may be processed.

Figure 2C:
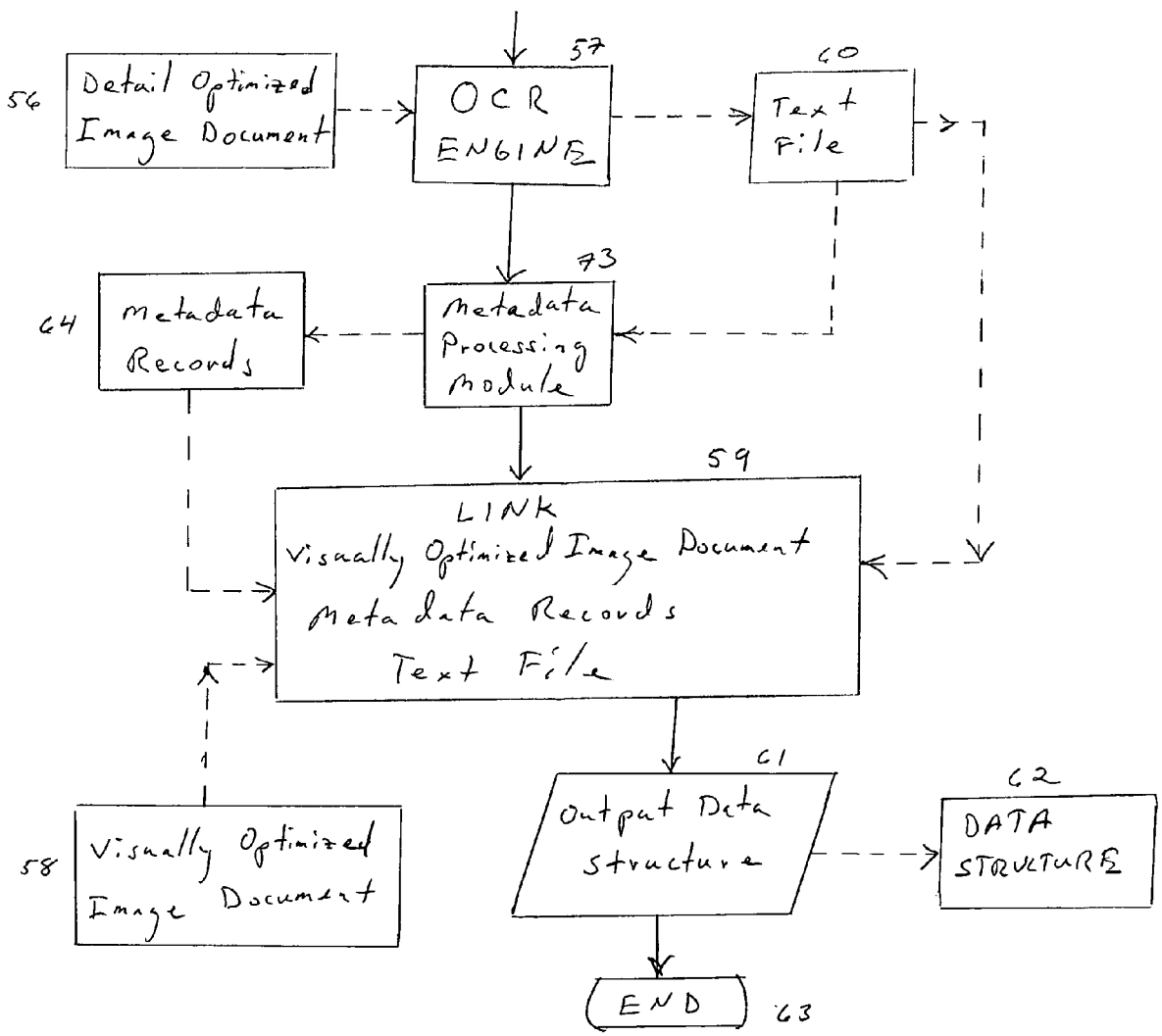
FIG. 2C illustrates the data flow and flow of operations between modules in a block diagram of exemplary embodiment of a portion of a system in accordance with the present invention.

The data structure 62 may incorporate metadata records 64 to assist in locating text files 60 and linked visually optimized electronic image documents 58. Metadata records 64 may be linked with the visually optimized electronic image document 58 and with the text file 60 in the data structure 62, as exemplified by the exemplary embodiment of a portion of a system 20 in accord with the present invention illustrated in FIG. 2C. The portion of the system 20 illustrated in FIG. 2C, begins with the OCR engine 57 processing the detail optimized electronic image document 58 with an OCR engine 57 to create a text file 60.

The metadata processing module 73 may insert attributes that describe the text file 60 and the visually optimized electronic image document 58 corresponding to the text file 60 into the metadata record 64. For example, the metadata processing module 73 may search the text file 60 for occurrences of tagged text 66. The tagged text 66 found by the search may then be written to a metadata record 64. As another example, the metadata processing module 73 may search the text file 60 for occurrences of keywords and write the keywords to the metadata record 64. As an additional example, the document name 76 may be processed by module 73 and entered into the metadata record 64. The metadata record 64 may be in the form of tagged text 66. The tagged text 66 may be formatted for use by other system 20 modules, which may convert the tagged text 66 into metadata for every occurrence and variation of the tagged text 66. For example, the tagged text "<<=sec:spt=>>" could be converted to the metadata key words "Section: Sports".

Module 59 then links the text file 60, the visually optimized electronic image document 58, and the metadata record 64 into a data structure 62. The detail optimized electronic image document 56 may be discarded by module 59. The data structure 62 may be written to hard disk 28, removable media 29, or stored in other readily recognizable ways. Looping and other structures may be provided so that a plurality of physical documents 22 may be processed. The system 20 is exited at 63.

Figure 2D:
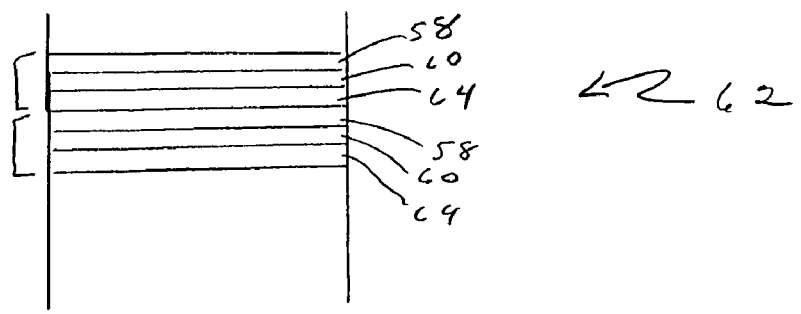
FIG. 2D illustrates an exemplary diagrammatic conceptual organization of a data structure incorporating visually optimized electronic image documents, linked text files, and linked metadata records.

An exemplary diagrammatic organization of an embodiment of a data structure 62 containing a plurality of visually optimized electronic image documents 58, corresponding text files 60, and corresponding metadata records 64 is illustrated in FIG. 2D. In this embodiment, the visually optimized electronic image document 58, the text file 60, and the metadata record 64 are separate elements that are, in turn, grouped together in the data structure 62.

Figure 2E:
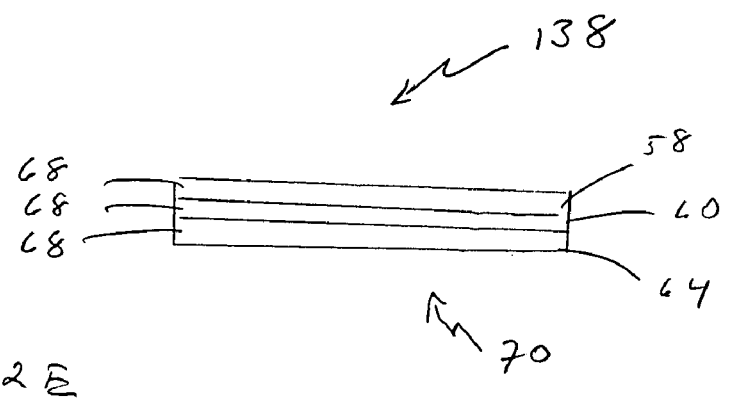
FIG. 2E illustrates an exemplary diagrammatic organization of an image over hidden text pdf document by showing the layers corresponding to the visually optimized electronic image document, the text file, and the metadata record.

An exemplary diagrammatic organization of an image over hidden text pdf document 138 showing the layers 68 corresponding to the visually optimized electronic image document 58, the text file 60, and the metadata record 64, is illustrated in FIG. 2E. The image over hidden text pdf document also presents an example of a unitary data structure 70 wherein the image data and the text data are collected together into a single file.

Figure 3A:
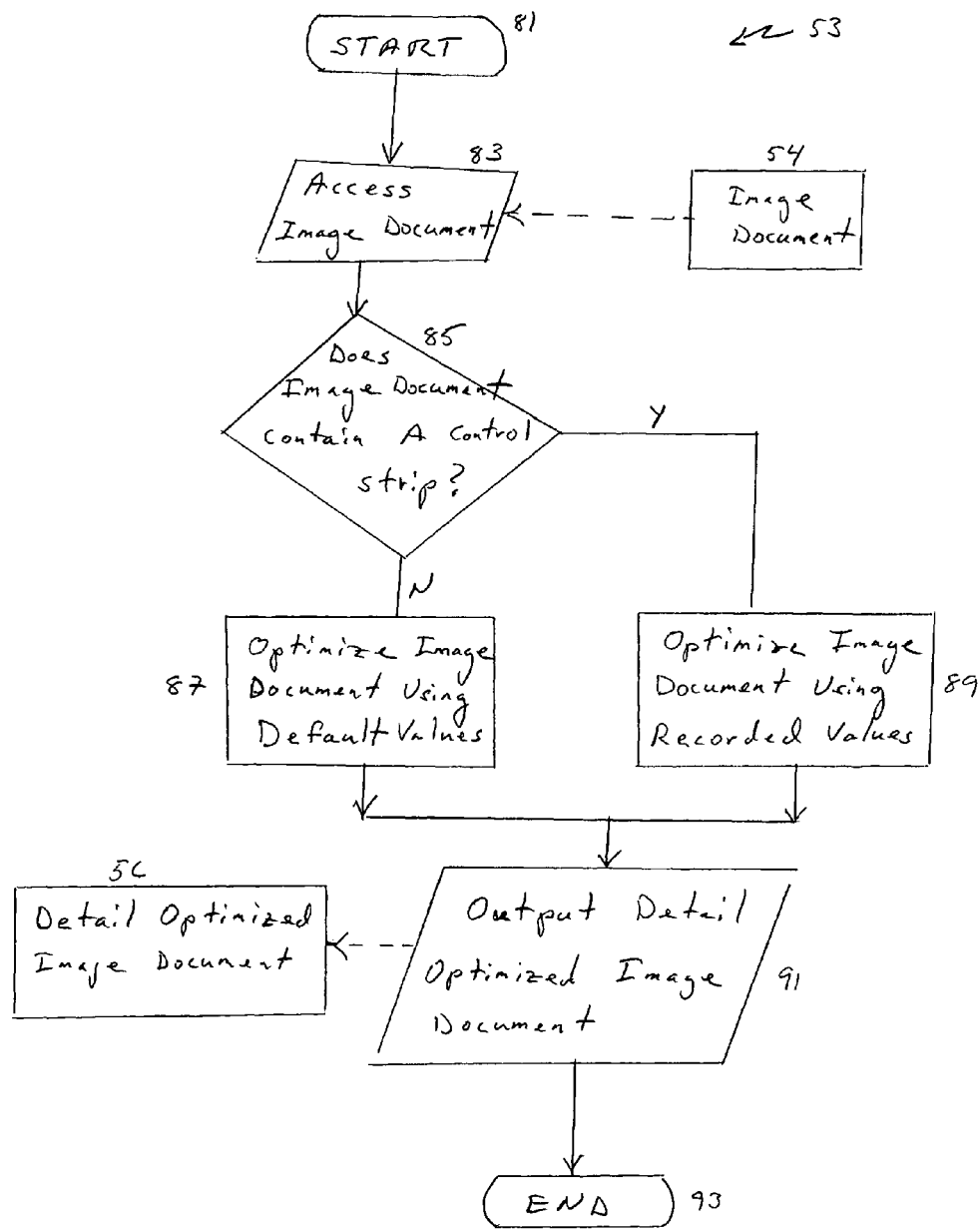
FIG. 3A illustrates in the form of a block diagram the data flow and flow of operations in an exemplary embodiment of a module of a system in accordance with the present invention that creates a detail optimized electronic image document from an electronic image document.

FIG. 3A further illustrates an embodiment of module 53, which creates a detail optimized electronic image document 56 from an electronic image document 54. As shown in FIG. 3A, module 53 is entered at 81. The electronic image document 54 is accessed by module 83. Module 85 queries the electronic image document 54 to determine if the electronic image document 54 contains a control strip. If the electronic image document 54 has a control strip, the electronic image document 54 is optimized using the recorded values from the control strip by module 87. If the electronic image document 54 does not have a control strip, the electronic image document 54 is optimized by module 89 using default values. The detail optimized electronic image document 56 is output from module 53 at module 91. Module 53 is exited at 93.

Figure 3B:
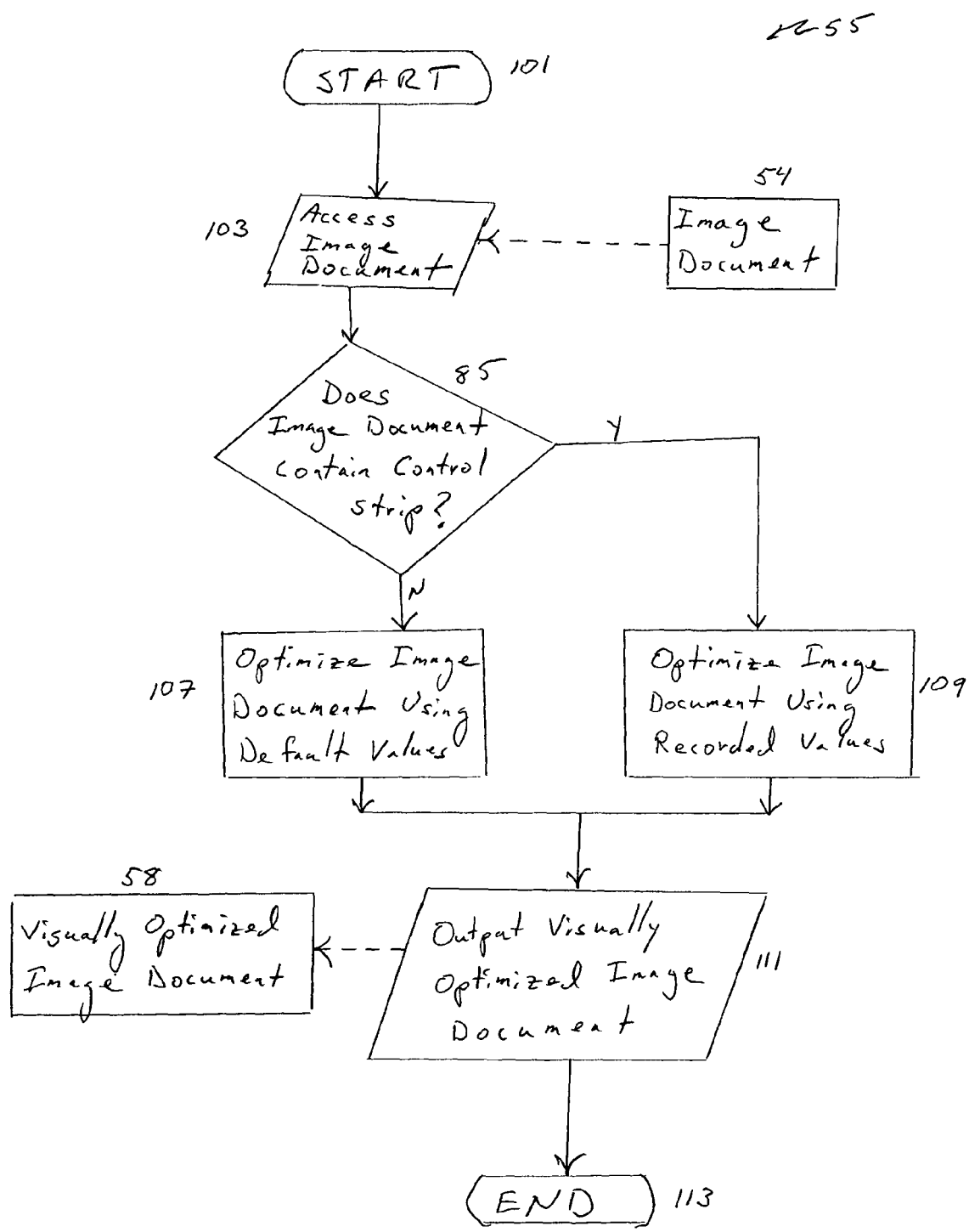
FIG. 3B illustrates in the form of a block diagram the data flow and flow of operations in an exemplary embodiment of a module of a system in accordance with the present invention that creates a visually optimized electronic image document from an electronic image document.

An embodiment of module 55, which creates a visually optimized electronic image document 58 from an electronic image document 54, is further illustrated in FIG. 3B. As illustrated in FIG. 3B, module 55 is entered at 101. The electronic image document 54 is accessed by module 103. Module 105 queries the electronic image document 54 to determine if the electronic image document 54 contains a control strip. If the electronic image document 54 has a control strip, the electronic image document 54 is optimized using the recorded values from the control strip by module 109. If the electronic image document 54 does not have a control strip, the electronic image document 54 is optimized by module 107 using default values. The visually optimized electronic image document 58 is output from module 55 at module 111. Module 55 is exited at 113.

Figure 4:
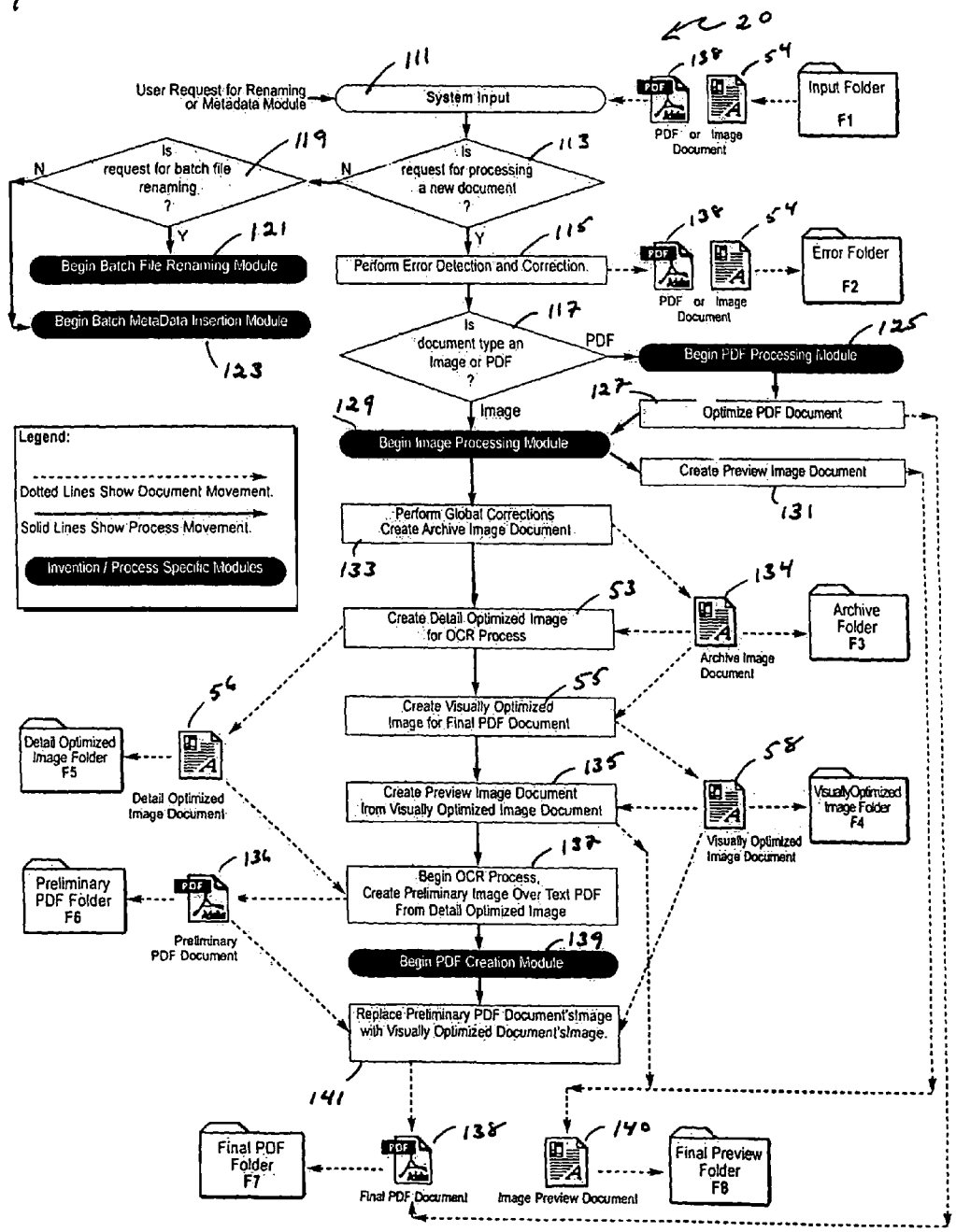
FIG. 4 illustrates an overview of an embodiment of a system according to the present invention by block diagram.

An overview of an embodiment of the system 20 components of apparatus and methods according to the present invention is illustrated in the block diagram of FIG. 4. The modules shown in the block diagram of FIG. 4 are further described by illustration in the block diagrams of FIGS. 5 to 13. FIGS. 5 to 13 illustrate an embodiment of a system 20 according to the present invention configured to use pdf as a data structure 62 for electronic image documents 54, linked text files 60, and metadata records 64. It would be recognized by one skilled in the art that alternative data structures 62 could be employed for the same purpose. The use of pdf as the data structure 62 in the embodiment of FIGS. 5 to 13 is merely for exemplary purposes only, and must not be considered a limitation on the scope of the present invention.

The system 20 may be initiated at 111, as illustrated in the embodiment of FIG. 4. Initiation could be prompted by a request from an end user, or by the presence of a physical document 22, an electronic image document 54 including an image over hidden text pdf document 138 in input folder F1. Each physical document 22, each electronic image document 22, and each image over hidden text pdf document 138 may be processed independently of other physical documents 22 and other electronic image documents 54 including pdf documents including image over hidden text pdf document 138. The system 20 may recursively move through all physical documents 22, electronic image documents 54, and image over hidden text pdf document 138 present in the input folder F1 until all documents have been processed.

The system 20 utilizes a predetermined document naming scheme or nomenclature. The nomenclature may be structured to yield the maximum amount of information about the document with minimal characters. The nomenclature may be also structured for mathematical sorting, incrementing and logical grouping. The lack of success in prior art metadata systems may be the reliance on optional, human entry of keywords, which may be time consuming and prone to errors. Since a document should be named before the document may be saved, the system 20 assumes that the document has a name, and, therefore, a nomenclature.

The manner of initiation may be evaluated at module 113 to determine the process flow. In order to facilitate complete, unattended automation, physical documents 22, electronic image documents 54 including image over hidden text pdf documents 138 present in Input Folder F1 may start the system 20 automatically. The system 20 may continuously monitor Input Folder F1 to check for the presence of an electronic image document 54. If input is a request from an end user, process control is given to module 119. In some embodiments, a request from an end user may be detected by a browser-based query to the system 20. Module 119 can determine the module requested as detected by the browser-based query and gives control to the appropriate module, either module 121 or module 123.

In order to rename documents that may conform to nomenclature rules, a renaming module 121 may be employed. The renaming module 121 may apply intelligent renaming to electronic image documents 54 based on user input through a graphic user interface. In order to eliminate input errors, there may be no keyboard input from the end user. Renamed electronic image documents 54 can be immediately placed into the Input Folder F1 to invoke module 113 as a new electronic image document 54.

The begin metadata module 123 makes the image over hidden text pdf document 138 more accessible by adding additional metadata records 64 to image over hidden text pdf documents 138 that reside in the final pdf folder F7. Metadata records 64 may be added through a graphic user interface. In order to eliminate input errors, keyboard input from the end user may not be allowed.

In order to prevent system 20 interruptions and suspensions, all electronic image documents 54 may be checked for attributes that could cause errors in subsequent modules at error detection module 115. Error detection may be performed by testing the electronic image document 54 against a set of rules as defined in a job specification file. If an electronic image document 54 fails the test, the system 20 may attempt to correct the problem. If the system 20 cannot resolve the problem, the electronic image document 54 may be moved to the Error Folder F2.

Document type detection 117 allows the system 20 to process electronic image document 54 in a variety of image formats by detecting the image format of the electronic image document 54. Depending upon the image format of the electronic image document 54, control may be given to module 125 or module 129.

If the image format of the electronic image document 54 is pdf, the begin pdf processing module 125 is initiated. To ensure that the electronic image document 54 can be viewed and transmitted successfully, it may be optimized by the optimize pdf document module 127. Optimization includes removing unnecessary elements, reducing the file size of the electronic image document 54, and converting the color space to RGB for viewing on a computer monitor. The optimized electronic image document 54 in pdf image format may be saved in the final pdf folder F7.

To aid in the navigation of the final user interface, an image preview document 140 may be created in create image preview document 131. The image preview document 140 may be 5 to 10%, for example, of the file size of the corresponding electronic image document 54. An end user may reference an image preview document 140 before committing to opening the electronic image document 54. Module 131 creates this image preview document 140 by employing the image processing module 129. The image preview document 140 may be saved in the Final Preview Folder F8.

The image processing module 129 may be used to manipulate electronic image documents 54 to achieve optimum results in subsequent modules. An archive electronic image document 134 may be created at module 133 to provide a source of "back-up" in the event that the subsequent modules produce unwanted results. If unwanted results occur, the process can be altered and repeated by placing the archive electronic image document 134 in the Input Folder F1. In order to reduce process redundancy and increase speed, an archive electronic image document 134 created at module 133 should contain corrections that are consistent with the requirements of all subsequent modules. An example would be rotating the image to its correct orientation. The archive electronic image document 133 may be saved in the Archive Image Folder F3.

In order to achieve the best possible results from the OCR engine 57, the OCR engine 57 must process a detail optimized electronic image document 56. Module 53 creates a detail optimized electronic image document 57 by increasing the file size, converting the image to black and white and adding contrast and detail. The detail optimized electronic image document 57 may be saved in the detail optimized folder F5.

A visually optimized electronic image document 58, which is a pleasing image that may be in full color but small enough to transfer over a network or Internet connection, is created at module 55. The system 20 at module 55 creates the visually optimized electronic image document 58 by first reverting back to the archive electronic image document 134 saved by module 133. Module 55 may then reduces the file size, converts the image to RGB color, and make detail and color enhancements to the archive electronic image document 134 to create a visually optimized electronic image document 58. The visually optimized electronic image document 58 may be saved in the Visually Optimized folder F4.

Similar to module 131, an image preview document 140 may be created for navigational purposes by the system 20 at module 135. Since an image preview document 140 may be viewed by an end user, the image preview document 140 created in module 135 may be derived from the visually optimized electronic image document 58 created in module 55. The image preview document 140 may be saved in the Final Preview Folder F8.

The system 20 initiates the OCR engine 57 at module 137 by presenting the OCR engine 57 with the detail optimized electronic image document 56 from module 53. Module 137 instructs the OCR engine 57 to create a data structure in the form of an image over hidden text pdf document 138 and save the image over hidden text pdf document 138 in the preliminary pdf folder F6. Since the detail optimized electronic image document 56 was tailored for optical character recognition, optimum results may be achieved by the OCR engine 57.

The pdf creation module 139 begins by opening the image over hidden text pdf document 138 that was created in module 137. To make the image over hidden text pdf document 138 more accessible, the nomenclature of the image over hidden text pdf document 138 is converted into metadata records 64 that may be written into the image over hidden text pdf document 138 at module 139.

As module 141 is entered, the image over hidden text pdf document 138 contains text from the OCR engine 57, metadata records 64, and the detail optimized electronic image document 56. Module 141 removes the detailed optimized electronic image document 56 from the image over hidden text pdf document 138 and inserts the visually optimized electronic image document 58. The image over hidden text pdf document 138 may be saved in the final pdf folder F7.

Figure 5:
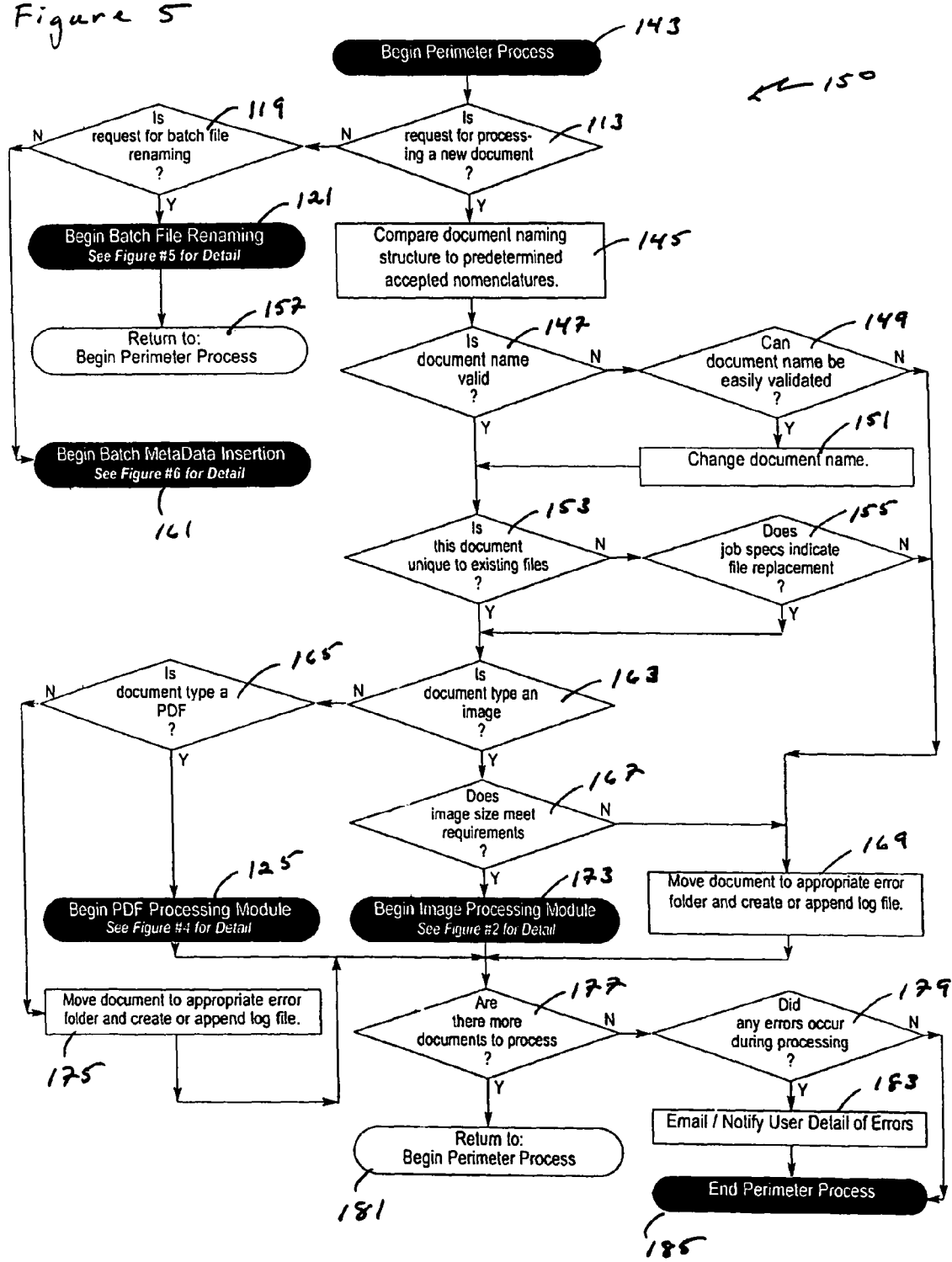
FIG. 5 illustrates the perimeter process of an embodiment of a system according to the present invention by block diagram.

Module 143 represents the entry and initialization of the perimeter process 150, which controls the processing of electronic image documents 54 by orchestrating the execution of the various modules. An embodiment of the perimeter process 150 is illustrated in FIG. 5 and described in the following. A single or multitude of electronic image documents 54 placed into a folder may automatically launch the process. A request from a remote client may also launch the process, but may initiate a different module 113.

Module 145 can evaluate the electronic image document name 54 against predetermined nomenclature rules. These rules can be different and dynamic based on the input folder F1 or the first few characters in the document name or the parent folder of folder F1. If the electronic image document 54 name does not evaluate to a known nomenclature, the perimeter process 150 may apply simple logic to see if it can achieve a match. This logic includes but may be not limited to: The use of O ("oh") instead of a 0 ("zero"), Leading or trailing blank spaces, 2 repetitive separators in a row ("-" or "."), Uppercase characters instead of lowercase, etc. If the perimeter process 150 can resolve the conflict, the electronic image document 54 may be renamed accordingly at module 151 and processing resumes at module 153. If the system 20 cannot resolve the conflict, the electronic image document 54 may be moved 169 to folder F2A, which may be a subfolder of folder F2. Processing may resume at module 177.

To avoid unnecessary interruptions and the need for human intervention, the system 20 may be designed to resolve any and all conflicts it encounters. Unresolved documents may be moved 169 to one of the four error folders: F2A, F2B, F2C, F2D. In all cases, processing may resume at module 177.

Module 153 can compare the electronic image document 54 name against previously completed documents in folders F8. If the electronic image document 54 has been processed before, the job specifications are checked 155 for instructions on how to proceed. If the job specifications indicate replacement as true 155, the electronic image document 54 may proceed to module 163 with the intent to replace all current documents in all subsequent folders with its content. If the job specifications indicate replacement as false, the document may be moved 169 to folder F2B, with processing resuming at module 177.

Module 163 checks that the electronic image document 54 is, in fact, an electronic image document 54, and not some other type of file. If the electronic image document 54 is an electronic image document 54, the system 20 advances the electronic image document to module 167. Module 165 determines if the electronic image document type is pdf. If the document type is not pdf, the document may be moved 169 to folder F2D with processing resuming at module 177.

Module 167 can check the size of the electronic image document 54 against predetermined job specifications. The size of the electronic image document 54 must meet or exceed minimum size requirements in order to guarantee accuracy and quality. If the electronic image document 54 size falls below the minimum size requirement, the electronic image document may be moved 169 to folder F2C, with processing resuming at module 177.

Module 177 checks for electronic image documents 54 in the input folder F1. If electronic image documents 54 still exist in the input folder F1, the perimeter process 150 may be repeated 181 at module 113 with the electronic image document 54. If module 177 determines that the perimeter process 150 has processed all the available electronic image documents 54, an appropriate summary may be generated at module 179. Module 179 can determine if any errors occurred during processing and may perform the appropriate action based on the job specifications. Typically this may be e-mail to the client and/or the system administrator by module 183. Module 185 represents the completion of the perimeter process 150 for input folder F1. The perimeter process 150 may be automatically initiated again by the presence of electronic image documents 54 in the input folder F1.

Figure 6:
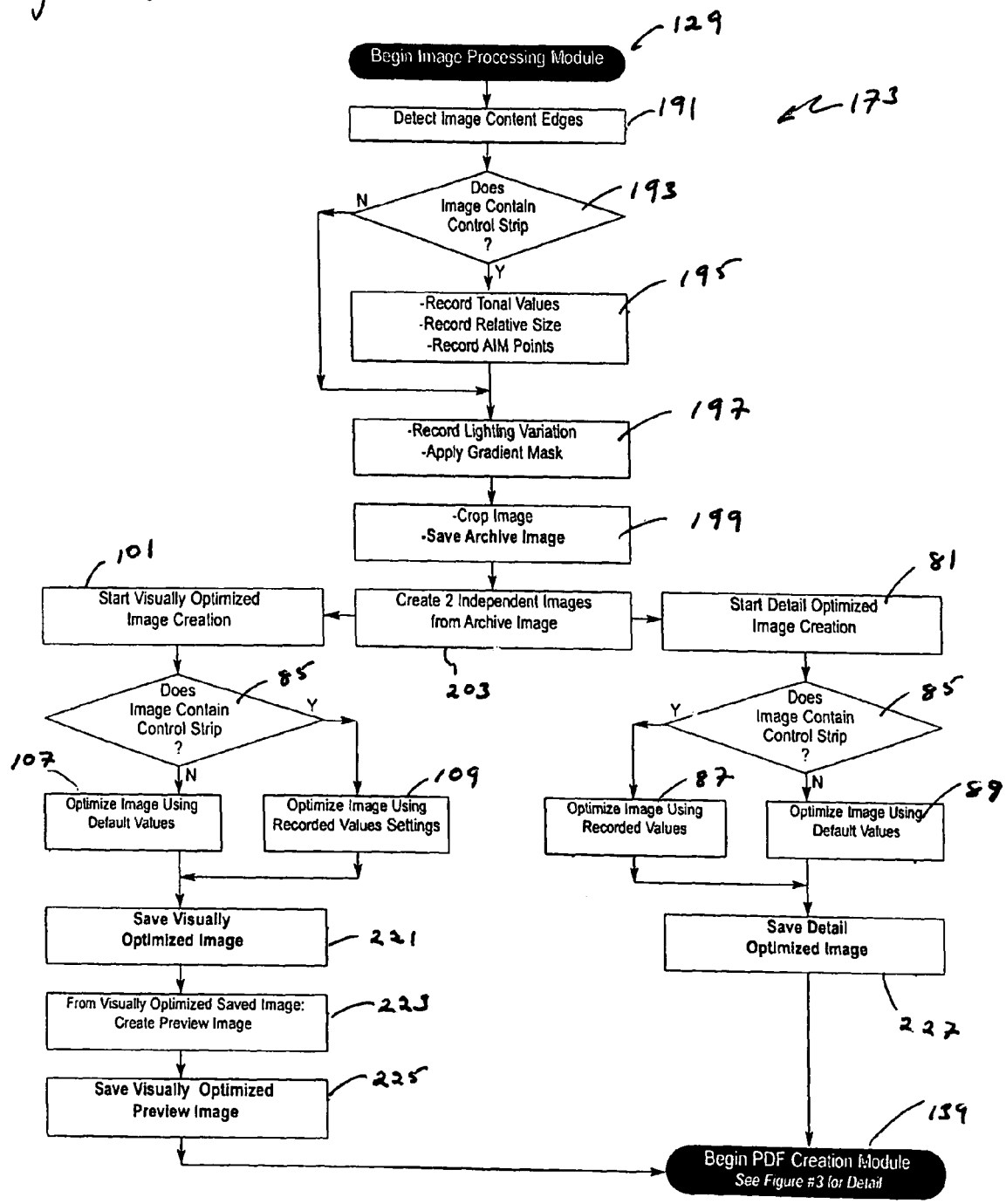
FIG. 6 illustrates the image processing module of an embodiment of a system according to the present invention by block diagram.

The image processing module 173 processes electronic image documents 54 in order to create a detail optimized electronic image document 56 and a visually optimized electronic image document 58. FIG. 6 illustrates a detailed block diagram of an embodiment of the image processing module 173.

As illustrated in the embodiment of FIG. 6, module 129 may start the image processing module 173. An electronic image document 54 created from a physical document may have a background surrounding the actual document content, or "live" area. This background can be identified and isolated from the document content. Module 191 utilizes image masking and progressive selections and histogram evaluations of the entire electronic image document to determine the actual live edge of the electronic image document.

A control strip may be incorporated into the background of the electronic image document 54 when the electronic image document 54 is created. The control strip contains known values that can be used to optimize the final size and quality of the electronic image document, as would be readily recognized by those skilled in the art. Module 195 may perform an evaluation of the image edges as determined by module 193.

If module 193 determines that a control strip is present, the system 20 advances to module 195.

Module 195 can determine the perimeter of the control strip and records the tonal values (measurement of lightness or darkness) from known points on the control strip. The size of the control strip may be also recorded. A series of tonal values may be read from the control strip from a long, uniform area. These values may be used for subsequent masking values.

If module 193 determines that a control strip is not present, then module 197 reads a series of tonal values from the available background. Module 197 may apply a gradient mask that negates the effect of any detected uneven lighting. If a control strip is present, the gradient mask is determined by values from module 195. If a control strip is not present, the gradient mask is determined by the background samples.

After the gradient mask is applied, module 199 may crop or trim the electronic image document 54 to the live edges of the electronic image document 54, thereby eliminating the background in the electronic image document 54. A rotation of the electronic image document 54 may also be performed as dictated by the job specifications. Module 199 may save the electronic image document in folder F3. This may be referred to as the archive electronic image document 134, since the archive electronic image document 134 has undergone relatively little alteration from the electronic image document 54.

Module 203 starts the independent creation of a detailed optimized electronic image document 56 and a visually optimized electronic image document 58. The process of creating a visually optimized electronic image document 56 begins at module 101. The efficiency and the accuracy of the OCR engine 57 are not factors in the creation of a visually optimized electronic image document 58.

Module 85 checks for the availability of a control strip as determined by module 193 and recorded by module 195. If a control strip is available and recorded, tonal values from the control strip recorded by module 195 may be executed to adjust the contrast and color of the visually optimized electronic image document 58 by module 109. A secondary adjustment to the visually optimized electronic image document 58 may be also made based on values obtained from the archive electronic image document 134 by module 109. The final image size may be precisely calculated from the recorded size of the control strip. A series of masks and filters may be applied to enhance the image for visual appearances.

If a control strip is not available, an adjustment may be made based on values obtained from the archive electronic image document 134 by module 107. The final image size may be calculated from a default setting obtained from the job specifications. A series of masks and filters may be applied to enhance visual appearance.

Module 221 saves the visually optimized electronic image document in folder F4. Module 223 creates an image preview document 140 from the visually optimized electronic image document 56 for use in subsequent processes. Module 225 saves the image preview document 140 in folder F8.

Module 81 begins the process of solely creating a detail optimized electronic image document 56. Module 81 checks for the availability of a control strip as determined by module 193 and recorded by module 195. If a control strip is available and recorded, tonal values from the control strip may be executed to adjust contrast and color 87 of the detail optimized electronic image document 56. A secondary adjustment to the detail optimized electronic image document 56 may be also made based on values obtained from the electronic image document 54 by module 87. The final detail optimized electronic image document 56 size may be obtained from the visually optimized electronic image document 58. A series of masks and filters may be applied to enhance the detail optimized electronic image document 56 for the OCR engine 57. Module 227 saves the detail optimized electronic image document 56 in folder F5.

Figure 7:
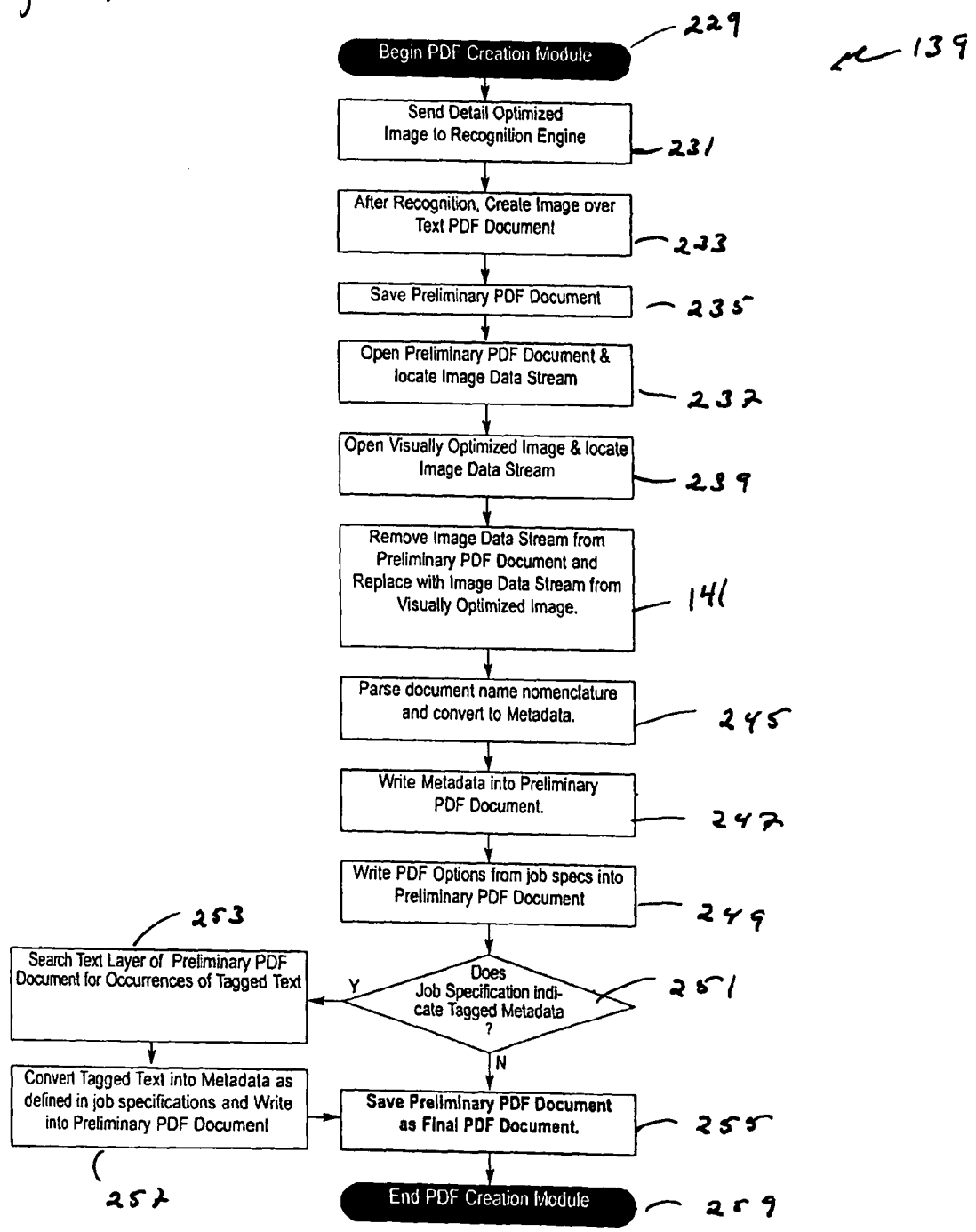
FIG. 7 illustrates the pdf creation module of an embodiment of a system according to the present invention by block diagram.

The pdf creation module 139 is shown in the exemplary embodiment illustrated by the block diagram of FIG. 7. A detailed block diagram of an embodiment of the pdf creation module 139 is illustrated in FIG. 7. The pdf creation module is entered at 229.

Module 231 sends the detail optimized electronic image document 56 to the OCR engine 57 to produce a text file 60. The OCR engine 57 creates an image over hidden text pdf document 138 using the detail optimized electronic image document 56 and the text file 60 and saves 235 the image over hidden text pdf document 138 in folder F6.

The detail optimized electronic image document 56 is replaced by the visually optimized electronic image document 58 in the hidden text pdf document 138. Module 237 opens the image over hidden text pdf document 138 created in module 235 and locates the image data stream. Module 239 opens the visually optimized electronic image document 58 saved in module 221 and locates the image data stream. Module 141 deletes the image data stream from the image over hidden text pdf 138 and inserts the image data stream from the visually optimized electronic image document 58.

Metadata records 64 are inserted into the image over hidden text pdf document 138. Module 245 parses the document name as described in the job specifications, and converts the document name to a metadata record 64. Module 247 writes metadata records 64 based on the parsed document name into the current image over hidden text pdf document 138. Module 249 writes optional pdf parameters into the image over hidden text pdf document 138 based on the job specifications. Module 251 may determine if the text file 60 contains tagged text, as controlled by the job specifications. The text file 60 layer 68 of the image over hidden text pdf document 138 is searched for occurrences of tagged text 66 by module 253. Module 257 converts the tagged text 66 into metadata records 64 and writes the metadata records 64 into the image over hidden text pdf document 138.

The image over hidden text pdf document 138, contains a visually optimized electronic image document 58, contains a text file 60, contains custom metadata records 64 and optional parameters. The image over hidden text pdf document 138 is saved into folder F7 by module 255. The pdf creation module 139 ends at 259.

Figure 8:
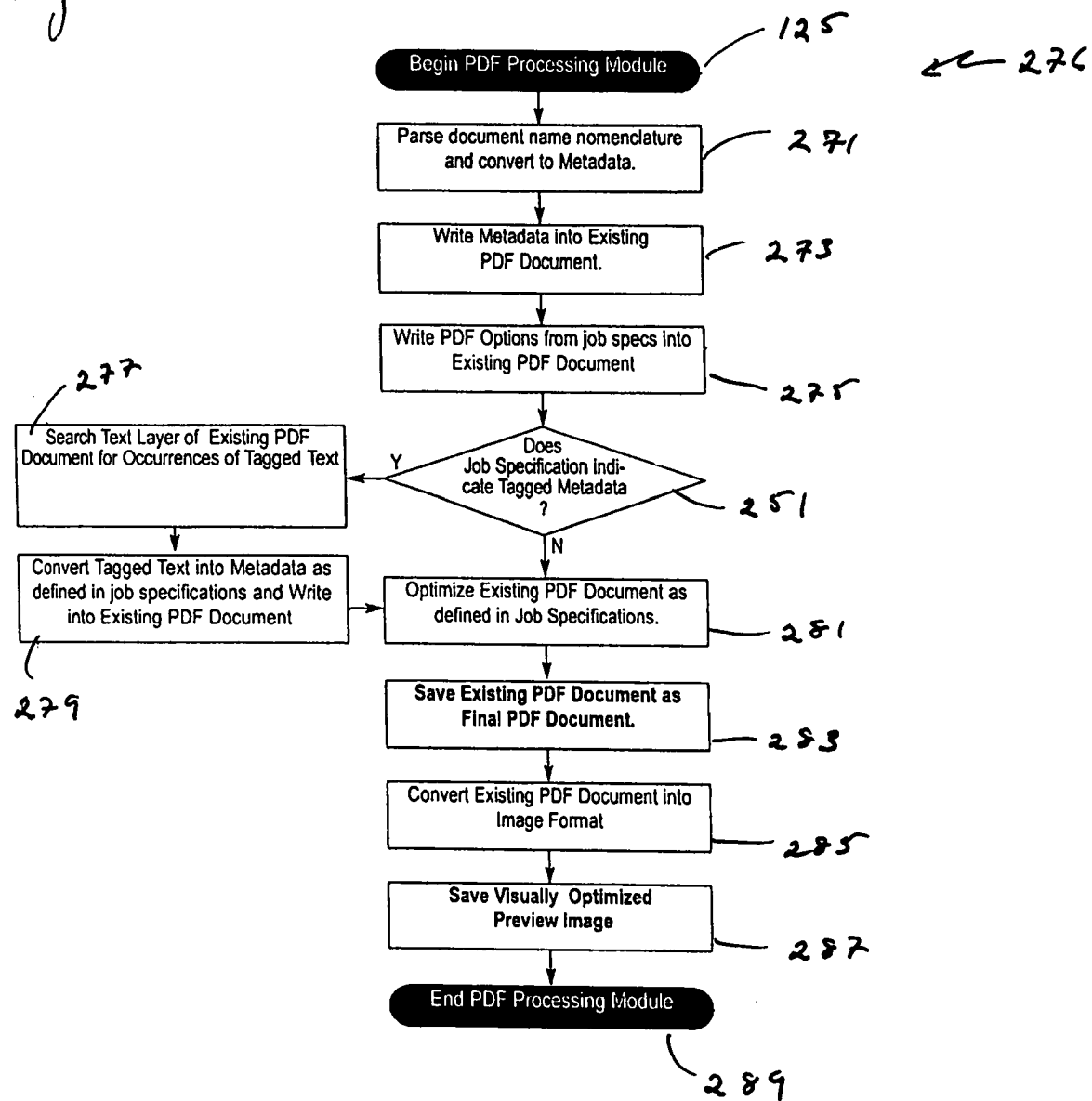
FIG. 8 illustrates the pdf processing module of an embodiment of a system according to the present invention by block diagram.

Image over hidden text pdf documents 138 are processed along a different path than other electronic image documents 54, as illustrated by the block diagram of an exemplary embodiment of FIG. 8. Module 125, as shown in FIG. 8, begins the pdf processing module 276.

Module 271 parses the document name, as described in the job specifications, and module 275 writes metadata records 64 based on the parsed document name in the image over hidden text pdf document 138. Module 251 determines whether or not the image over hidden text pdf document 138 contains tagged text 66 as determined by the job specifications. Module 277 searches the text file 60 layer 68 of the image over hidden text pdf document 138 for occurrences of tagged text 66, and module 279 converts the tagged text 66 into metadata records 64 and writes the metadata 64 into the image over hidden text pdf document 138.

The image over hidden text pdf document 138 is optimized by module 281, as indicated in the job specifications. Optimization could include removing unnecessary elements, reducing image size, and changing color space. Module 283 saves the image over hidden text pdf document 138 in folder F7.

Module 285 converts the image over hidden text pdf document 138 into a visually optimized image preview document 140. The image preview document 140 is saved in folder F8 by module 287, and the pdf processing module 276 ends at 289.

Figure 9:
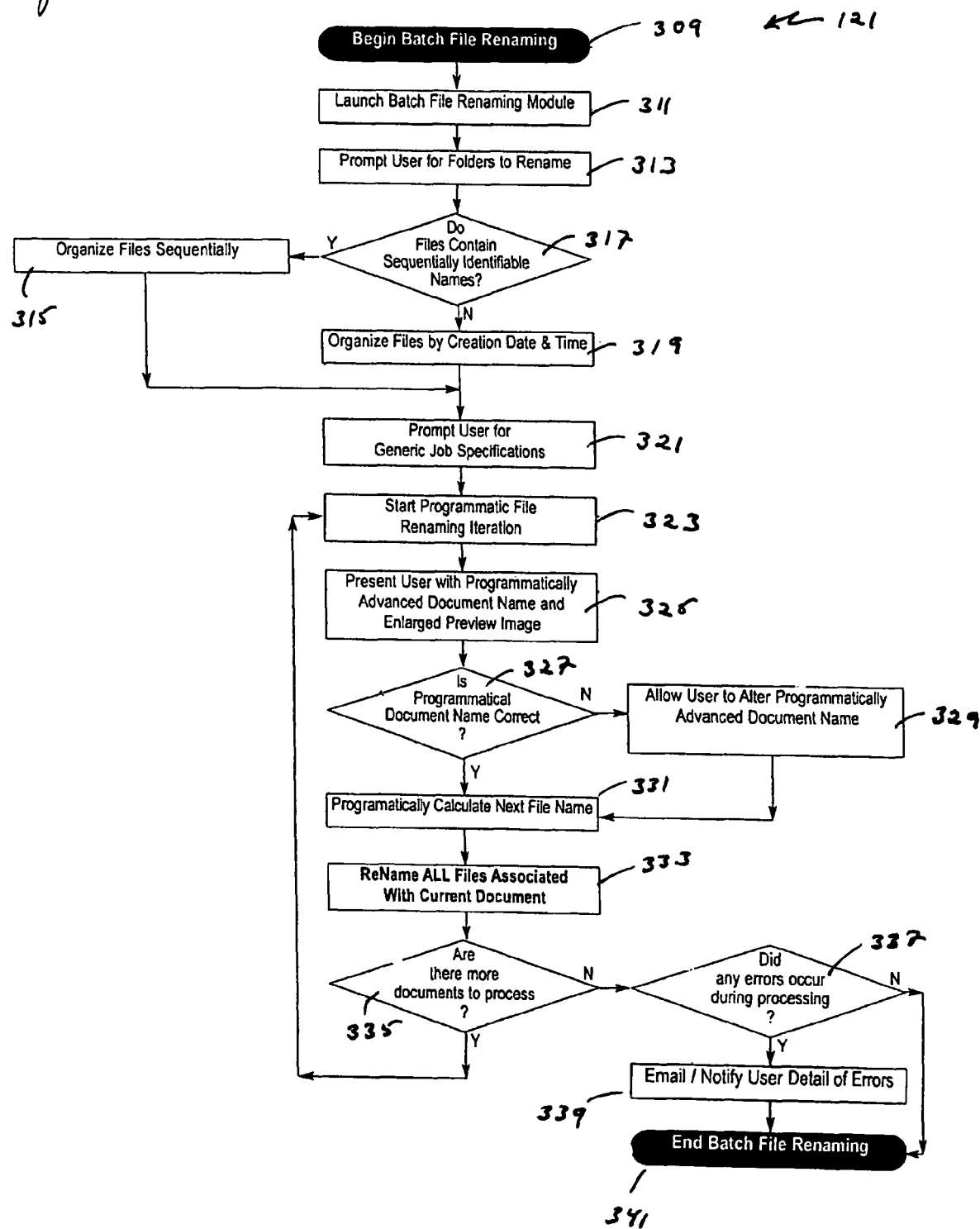
FIG. 9 illustrates the batch file renaming module of an embodiment of a system according to the present invention by block diagram.

The batch file renaming module 121, as illustrated, for example, in the embodiment of FIG. 9, preprocesses files prior to the perimeter process. For example, if a multitude of electronic image documents 54 were created and named sequentially doc-1, doc-2, doc3, etc., this module may be used to rename the electronic image documents 54 according to some more appropriate nomenclature.

The batch file renaming module 121 begins at 309, in the embodiment illustrated in FIG. 9. Module 311 launches the batch file renaming module 121. Module 313 may prompt the user to select a folder that contains the electronic image documents 54 for renaming. The location of the folder may be not relevant to any of the enclosed figures, since this may be a preprocessing module.

Module 317 evaluates the names of the electronic image documents 54 and attempts to determine a logical sequence from the names of the electronic image documents 54. If a logical sequence exists, module 315 may organize the names of the electronic image documents 54 into that logical sequence. If a logical sequence does not exist, module 319 may organize the names of the electronic image documents 54 by time and date.

Module 321 prompts the user for generic and global job specifications. This would include variables that may be constant for all the electronic image documents 54 in the folder. For example, if the nomenclature rules require a unique 3 digit code for a publication name, the three digit code plus the name the three digit code resolves to would be entered here. For example, the code nyt could be entered with New York Times being the name the three digit code nyt resolves to.

Module 323 starts the process of renaming all the electronic image documents 54 in the folder selected in module 313 to their respective valid nomenclature. Electronic image documents 54 may be presented to the user in the order as determined by modules 315 or 319. Module 325 may create an image preview document 140 of the current electronic image document 54 and insert the image preview document 140 into the User Interface.

When the first electronic image document 54 in the folder is renamed, the user interface may contain no pre-populated data other than the publication name as outlined in module 321. The user may read the image preview document 140 to determine required nomenclature values such as date, page, section, chapter, etc. The user may then select nomenclature values from the user interface that reflect the electronic image document 54. For example, if the electronic image document's 54 date is January 18, the user would select January from the month pull down menu, and 18 from the day pull down menu. If the electronic image document 54 is page 1, the user would select page 1 from the page pull down menu.

Module 325 increments the nomenclature of subsequent electronic image documents 54. In the example above, the user selected January 18 as the date and 1 as the page number for the first electronic image document 54 in the folder. Any subsequent electronic image document 54 presented to module 325 is analyzed against the previous electronic image document 54 and automatically incremented. Continuing with the example, the next electronic image document in module 325 would be automatically incremented to January 18 page 2. Pull down menus would advance to reflect the next electronic image document 54 and the corresponding image preview document 140 would be loaded into the interface.

Module 327 allows the user to accept the auto incremented name, or change the auto incremented name in module 329. If the user changes the auto incremented name, the next electronic image document 54 passing through module 325 will reflect those changes. Typically, greater than 90% of the electronic image documents 54 may be renamed with a single click.

After the user has accepted or changed the electronic image document 54 name, module 331 may convert the user-friendly description of the document name into the appropriate nomenclature. For example, the user reads the image preview document 140 and determines that the document is "The New York Times, Jan. 18th 2005 issue, page 1, section A." Module 331 may convert this user friendly code to, for example, nyt_2005_01_18_A_01.

Module 333 would rename the electronic image document 54 and any associated files to the new name as generated in module 331. An associated file may be one that has the same content, but may be of a different document type or structure. For example, if the current document has an image preview document named doc1.jpg and an archive electronic image document 134 named doc.tif, both files would be renamed by virtue of their identity as determined before the "." (period). The period starts the extension of the file and is not changed in the renaming process.

As the batch file renaming module 121 iterates through a series of electronic image documents 54, module 335 checks for additional electronic image documents 54 in the folder referenced in module 313. If additional electronic image documents 54 remain in the folder, control goes back to module 323. If module 335 determines that all available electronic image documents 54 have been renamed, an appropriate summary may be generated at module 337. Module 337 may determine if any errors occurred during processing and may perform the appropriate action based on the job specifications. Typically, the appropriate action may be e-mail to the client and/or the system administrator module 339. Module 341 represents the completion of the batch file renaming module 121.

Figure 10:
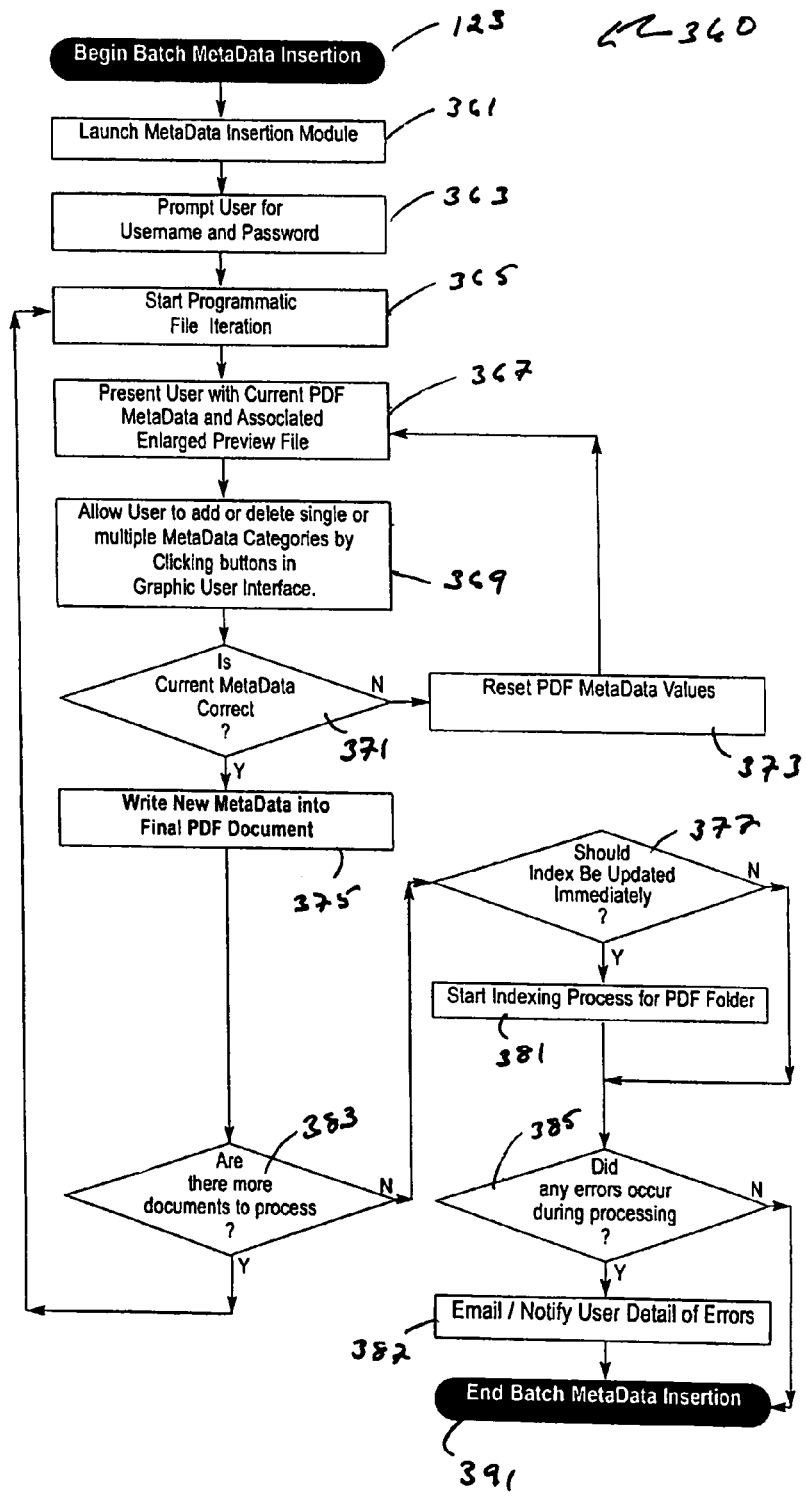
FIG. 10 illustrates the batch metadata insertion module of an embodiment of a system according to the present invention by block diagram.
Figure 12:
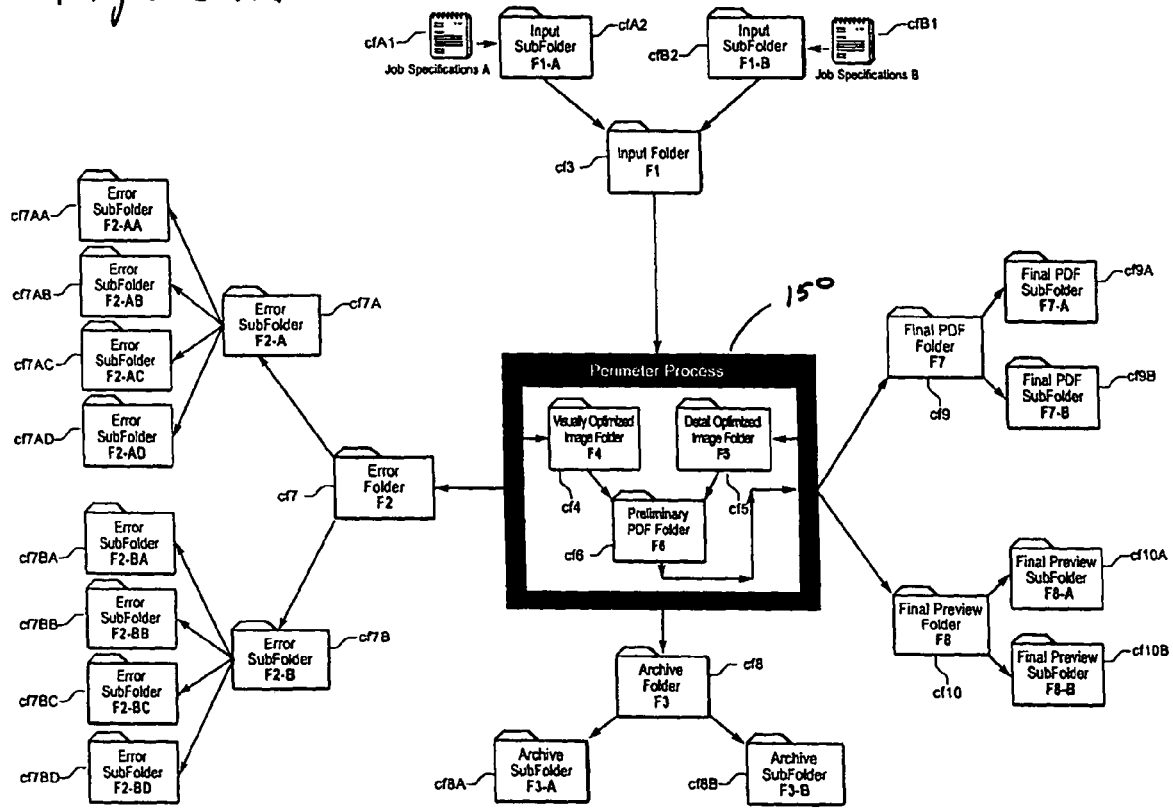
FIG. 12 illustrates the file distribution module of an embodiment of the present invention by block diagram; and, FIG. 13 illustrates a connectivity diagram that outlines an exemplary hierarchal structure of various modules of an embodiment of a system according to the present invention.

The batch metadata insertion module 360 adds additional functionality to an image over hidden text pdf document 138. An embodiment of the batch metadata insertion module is illustrated in the block diagram of FIG. 10. As illustrated in FIG. 10, the batch metadata insertion module is launched at module 361. Module 363 prompts the user for a username and password. Following a successful login, the appropriate final pdf folder may be selected by the program for editing. For example, FIG. 12 illustrates a folder hierarchy system for two users, User A and User B. If the login process reveals that the user is User A, then folder cf9A is selected. If the login process reveals that the user is User B, then folder cf9B is selected.

The file iteration process starts at module 365. Module 367 presents the user with the image preview document 140 of image over hidden text pdf document 138, and module 367 presents the user with the metadata records 64 contained in the image over hidden text pdf document 138.

Module 369 allows the user to quickly add or delete metadata records 64 by a simply click of the appropriate button in the graphical user interface. The labels on the buttons and the corresponding values may be determined by the job specifications. For example, a user who is working with a newspaper in the form of image over hidden text pdf document 138 may want to add sports, classifieds, obituaries and legal metadata records 64 into the image over hidden text pdf document 138 in order to enhance the ability to search the image over hidden text pdf document 138.

The job specifications may contain the names and values of the metadata records 64. A button labeled "Sports" could insert "spt" into the image over hidden text pdf document 138. A single image over hidden text pdf document 138 could contain none, one, or a multitude of metadata records 64. For speed, the buttons serve in an on/off capacity. Clicking the button may toggle the insertion of, or deletion of its corresponding value. A menu in the graphical interface may show what values are currently selected.

Module 371 confirms that the metadata record 64 is correct by a simple click on the preview image. Module 373 would "reset" the image over hidden text pdf document 138 to its status when first opened. Module 375 writes the metadata records 64 into the image over hidden text pdf document 138 in its current folder location by overwriting the image over hidden text pdf document 138. Module 383 checks for an image over hidden text pdf document 138 in the folder determined in module 363. If image over hidden text pdf documents 138 are available in the folder, control goes back to module 363. If module 383 determines that all of the available image over hidden text pdf documents 138 have been processed, control is transferred to module 377.

Indexing is the process of reading the text file 60 of the image over hidden text pdf documents 138 and writing the results into a database or index. During a search, an index may be read for the occurrences of search words, and then the appropriate image over hidden text pdf document 138 may be located. Indexing may be typically set to run once a day at a scheduled time. Depending on the number of image over hidden text pdf documents 138, indexing may slow down the computer that the image over hidden text pdf document 138 reside on.

Module 377 checks the job specifications for indexing. If the job specifications indicate immediate indexing, the indexing engine module 381 is launched, which means the changes made to the image over hidden text pdf document 138 metadata records 64 are available for searching immediately after indexing.

Error checking is conducted by module 385, and the appropriate action is taken based on the job specifications. Typically this may be e-mail to the client and/or the system administrator by module 387. Module 391 represents the completion of the batch metadata insertion module 360.

The file distribution module 402 provides the map that all electronic image documents 54 navigate from throughout any of the previously mentioned modules. The file distribution module 402 may receive input from operating modules and may also provide data to operating modules. The file distribution module 402 can create, rename or delete files, create, rename and delete folders, pass data to and from other modules. The file distribution module 402 can also aid in resolving nomenclatures and conflicts between electronic image document 54 names.

Figure 11:
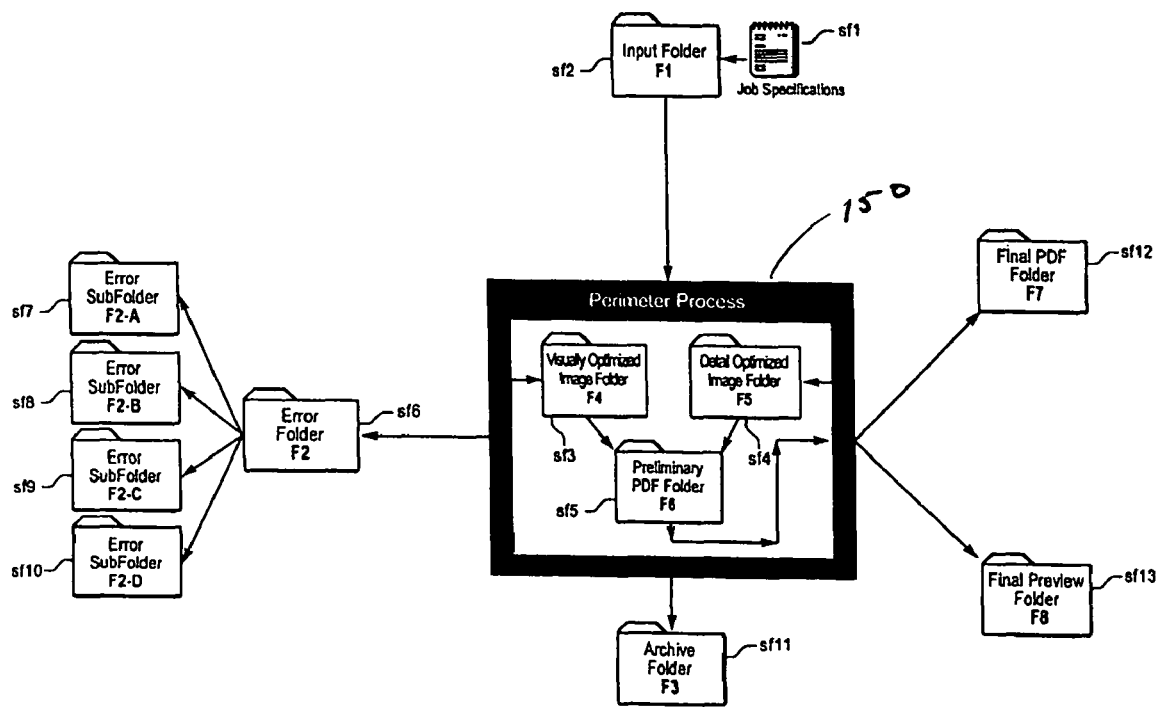
FIG. 11 illustrates the file distribution module of an embodiment of a system according to the present invention by block diagram.

FIG. 11 illustrates the components of an embodiment of a folder structure hierarchy and illustrates how the file distribution module 402 works within the folder structure. The components of another embodiment of a folder structure hierarchy and the functioning of the file distribution module 402 within the folder structure are illustrated in FIG. 12. A connectivity diagram outlining an exemplary hierarchal structure of various modules discussed above is illustrated in FIG. 13.

The foregoing discussion discloses and describes merely exemplary embodiments of the present invention. It should be understood that no limitation of the scope of the invention is intended thereby. Upon review of the specification, one skilled in the art will readily recognize from such discussion, and from the accompanying drawings and claims, that various changes, modifications and variations can be made therein without departing from the spirit and scope of the inventions as defined in the following claims.

I claim:

1. A computer apparatus for creating a text searchable data structure containing electronic image documents, comprising:
    a first module that converts an electronic image document into a visually optimized electronic image document, wherein the first module includes a processor and a memory coupled to the processor;
    a second module that converts an electronic image document into a detail optimized electronic image document, which is different than the visually optimized image, wherein the first module includes a processor and a memory coupled to the processor;
    an OCR engine that abstracts character information from the detail optimized electronic image document and writes the character information into a text file; and,
    a linking module that links the visually optimized electronic image document with the text file in a data structure.

2. The apparatus of claim 1, further comprising a data structure configured as a unitary data structure.

3. The apparatus of claim 1, further comprising a data structure configured as an image over hidden text pdf.

4. The apparatus of claim 1, further comprising:
    a module that writes metadata to a metadata record in the data structure, the metadata record linked with the text file and the metadata record linked with the visually optimized electronic image document in the data structure.

5. The apparatus of claim 1, further comprising:
    a module that searches the text file for occurrences of tagged text and writes the occurrences of tagged text to a metadata record in the data structure.

6. The apparatus of claim 1, wherein the OCR engine discards the detail optimized electronic image document after writing the character information into a text file.

7. The apparatus of claim 1, wherein the linking module is free from the detail optimized electronic image document.

8. A data structure created by a process comprising: generating a visually optimized electronic image document from an electronic image document; generating a detail optimized electronic image document from the electronic image document, which is different than the visually optimized electronic image document; using an optical character recognition engine to create a text file from the detail optimized electronic image document; and linking the visually optimized image with the text file in a data structure, and the data structure comprising:
    one or more visually optimized digital images derived from an original image file; and
    one or more text files derived from an optical character recognition optimized file that is derived from the original image file, each text file linked with the visually optimized digital image.

9. The data structure of claim 8, further comprising:
    one or more metadata records, each metadata record linked with the visually optimized digital image and each metadata record link with the text file.

10. The data structure of claim 8, further comprising:
    tagged text.

11. A method for creating a text searchable data structure containing electronic image documents, comprising:
    generating a visually optimized electronic image document from an electronic image document;
    generating a detail optimized electronic image document from the electronic image document, which is different than the visually optimized electronic image document;
    using an optical character recognition engine to create a text file from the detail optimized electronic image document; and
    linking the visually optimized image with the text file in a data structure.

12. The method of claim 11, wherein the data structure may be unitary.

13. The method of claim 11, wherein the data structure is an image over hidden text pdf document, the image over hidden text pdf document with the visually optimized electronic image document in one layer and the text file in one layer.

14. The method of claim 11, further comprising:
    writing metadata to a metadata record in the data structure; and
    linking the metadata record with the text file and the visually optimized electronic image document in the data structure.

15. The method of claim 11, wherein the data structure is an image over hidden text pdf document.

16. The method of claim 11, further comprising:
    identifying occurrences of tagged text in the text file; and,
    writing the occurrences of tagged text to a metadata record in the data structure.

17. The method of claim 11, wherein using an optical character recognition engine includes bypassing the visually optimized electronic image document past the optical character recognition engine.

18. The method of claim 11, discarding the detail optimized electronic image document after creating a text file from the detail optimized electronic image document.

19. The method of claim 11, wherein the data structure is free from the detail optimized electronic image document.

* * * * *